United States Patent [19]

Mosher

[11] 4,306,464

[45] Dec. 22, 1981

[54] MULTI-DIRECTIONAL MECHANICAL POSITIONING APPARATUS

[75] Inventor: Ralph S. Mosher, Elnora, N.Y.

[73] Assignee: Robotics, Inc., Ballston Spa, N.Y.

[21] Appl. No.: 849,636

[22] Filed: Nov. 8, 1977

[51] Int. Cl.³ ............................................. G05G 11/00
[52] U.S. Cl. ..................................... 74/479; 33/18 B;
            408/131; 408/137; 409/118; 414/749
[58] Field of Search ................ 33/18 B; 414/749, 750,
            414/751, 752, 753; 409/118; 408/3, 137, 131;
            74/479; 269/71

[56] References Cited

U.S. PATENT DOCUMENTS

| | | | |
|---|---|---|---|
| 4,271 | 11/1845 | Thurber | 33/18 B |
| 512,089 | 1/1894 | Bangerter | 33/18 B |
| 1,386,332 | 8/1921 | Hendrickson | 33/18 B |
| 1,883,204 | 10/1932 | Whitaker | 33/18 B |
| 2,737,709 | 3/1956 | Lovelace | 269/71 X |
| 2,927,556 | 3/1960 | Cain et al. | 91/37 X |
| 3,110,425 | 11/1963 | Fuller | 74/55 |
| 3,148,452 | 9/1964 | Rabenau | 33/18 B |
| 3,259,254 | 7/1966 | Mitchell | 91/37 |
| 3,269,013 | 8/1966 | Bullard | 91/37 X |
| 4,155,272 | 5/1979 | Mosher | 74/479 |

FOREIGN PATENT DOCUMENTS

| | | | |
|---|---|---|---|
| 251652 | 10/1912 | Fed. Rep. of Germany | 33/18 B |
| 821833 | 9/1937 | France | 33/18 B |
| 119014 | 9/1918 | United Kingdom | 33/18 B |

*Primary Examiner*—Irwin C. Cohen
*Attorney, Agent, or Firm*—Charles W. Helzer

[57] ABSTRACT

A low cost multi-directional movement cam controlled mechanical positioning apparatus is described for automatically tracing out the path of movement for the working head of a machine tool or the like. The apparatus may be embodied in a single machine providing for three-dimensional movement of the working head with or without additional controlled movement of the working head in either pitch, roll or yaw. Alternatively, the apparatus can be employed to provide additional degrees of movement either along a z-axis and/or in either pitch, roll or yaw to the working head of a two-dimensional automatic machine tool or conventional construction. The apparatus comprises a set of at least three relatively large diameter, disk-type, control-drive cams rotatably supported on a base member for controlling movement of the working head of a machine tool or the like within a plane defined by complementary axes of movement (such as the x-y axes) and along at least one additional degree of movement. A motor is provided for rotating the control-drive cams at a predetermined speed of rotation and cam follower means engage respective movement inducing cam surfaces formed on respective ones of the control-drive cams. Cam follower linkages coupled to respective ones of the cam followers directly drive a differentially operable transport mechanism that is supported on low friction wheels and tracks. The working head of the machine tool is secured to the transport mechanism and is moved thereby over a predetermined planar path of movement. A transport mechanism follower is coupled to the transport mechanism for freely following movement of the transport mechanism in its plane of movement without interference. Additional mechanical movement motion transmission means responsive to the additional cam follower and supported by the transport mechanism follower are provided for transmitting additional degrees of movement to the working head.

62 Claims, 14 Drawing Figures

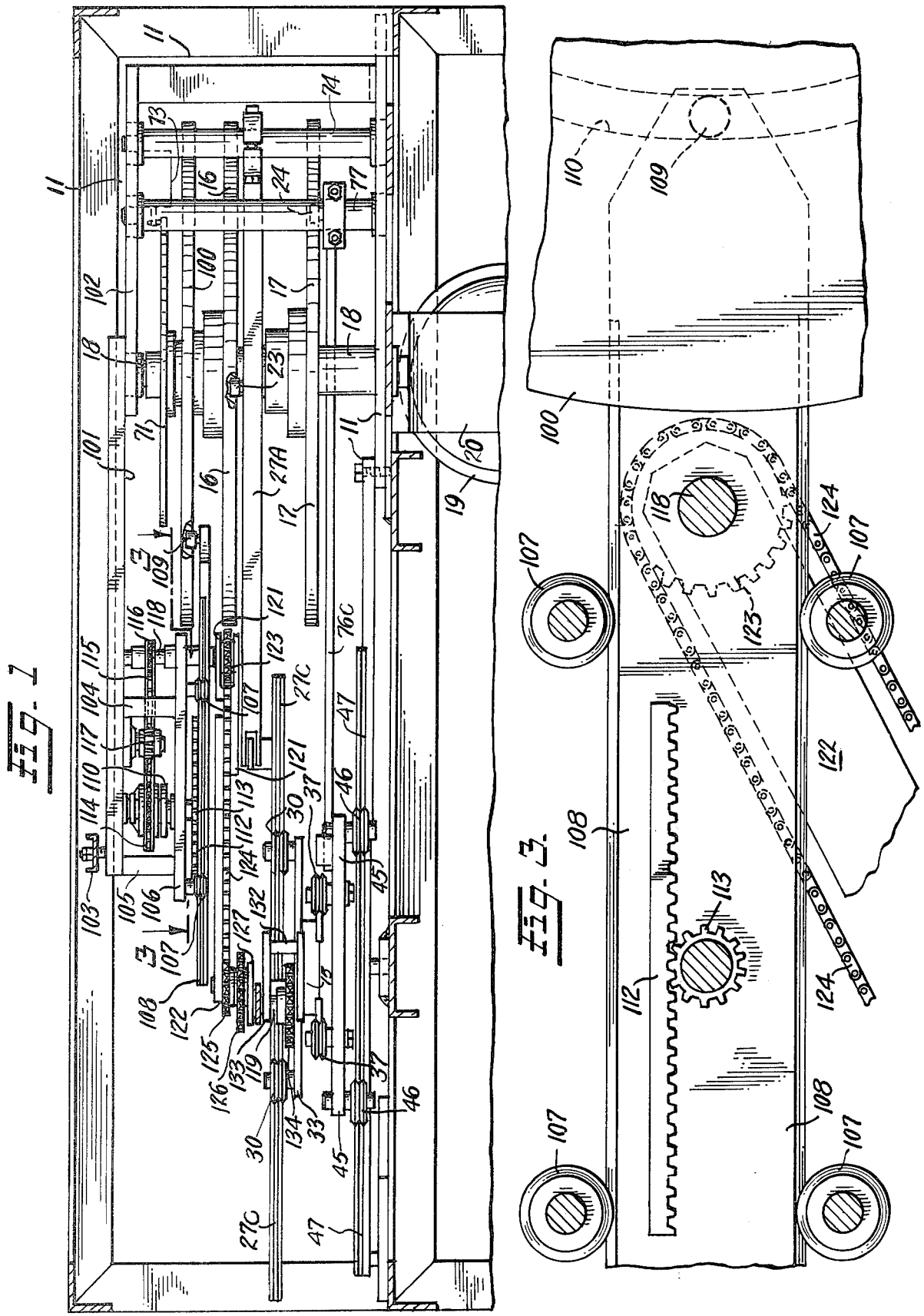

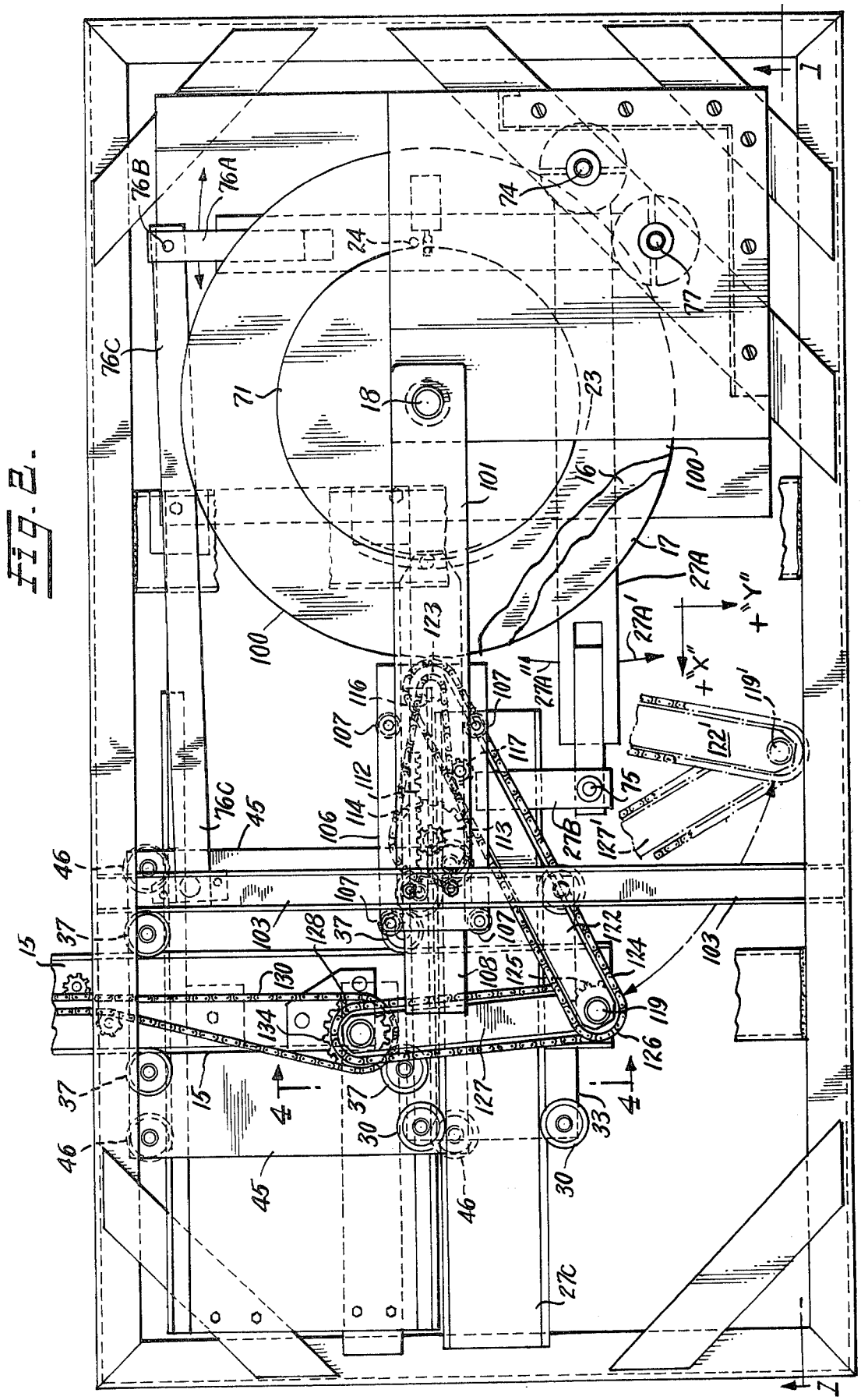

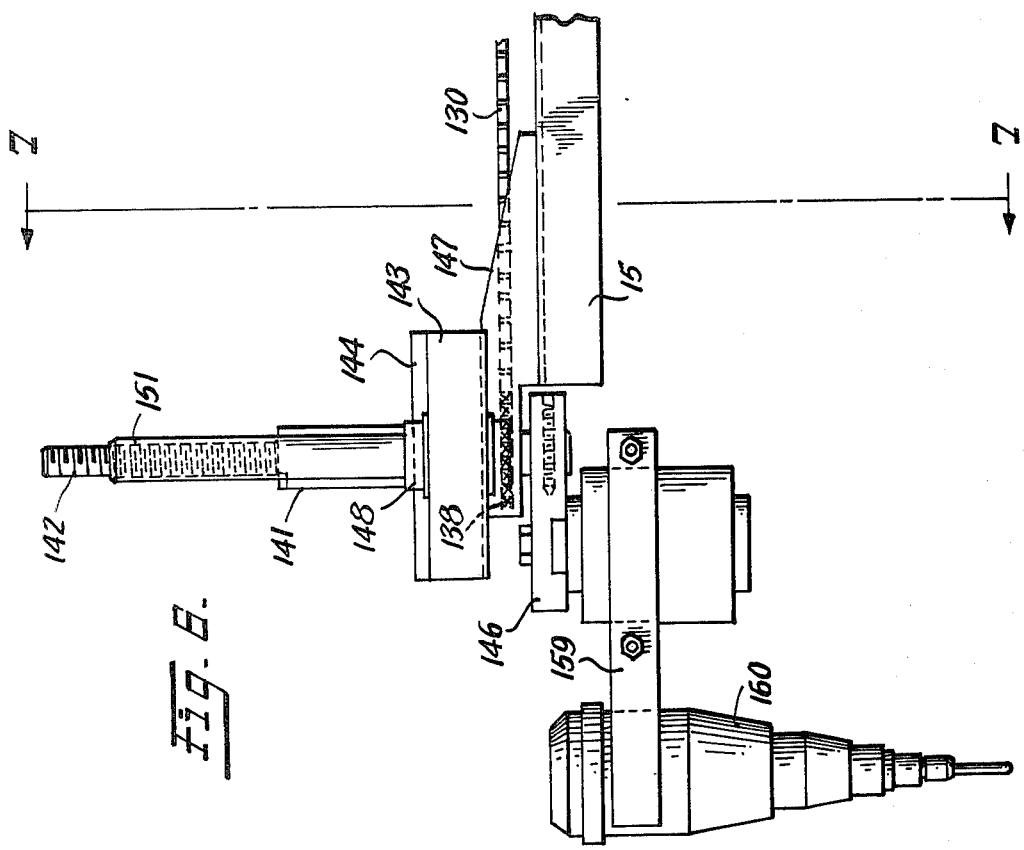
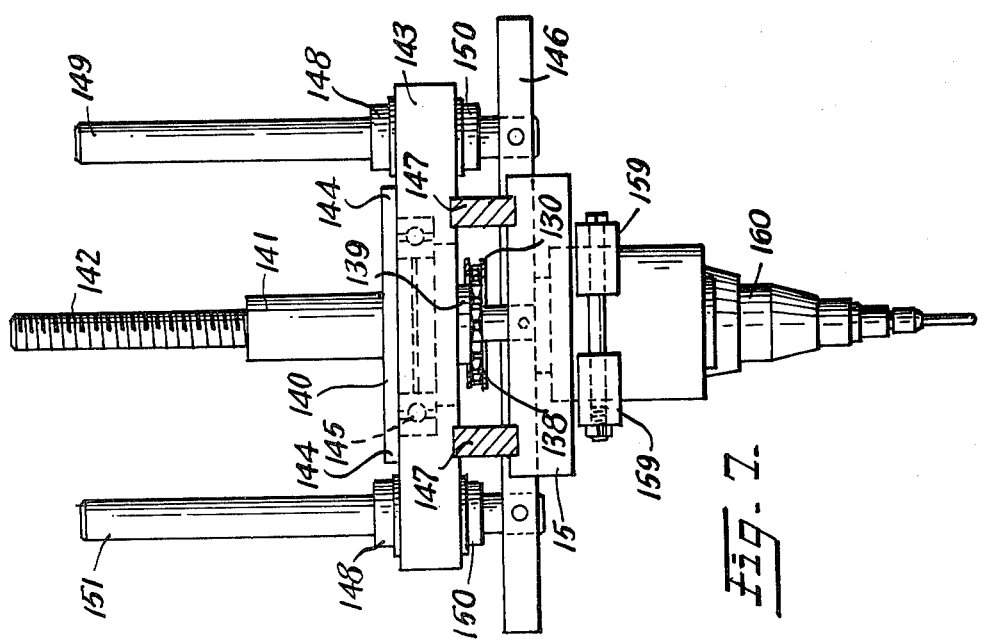

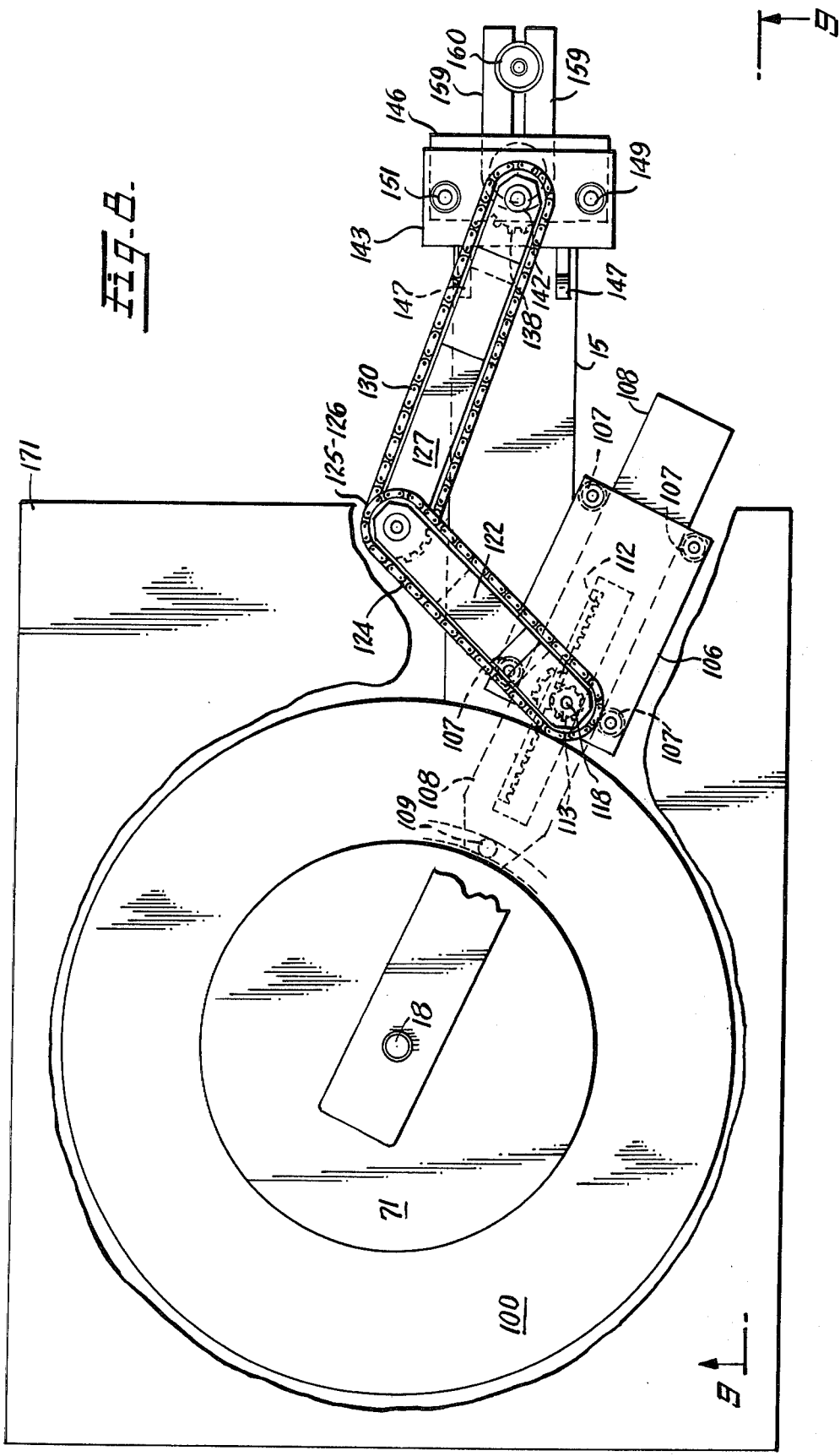

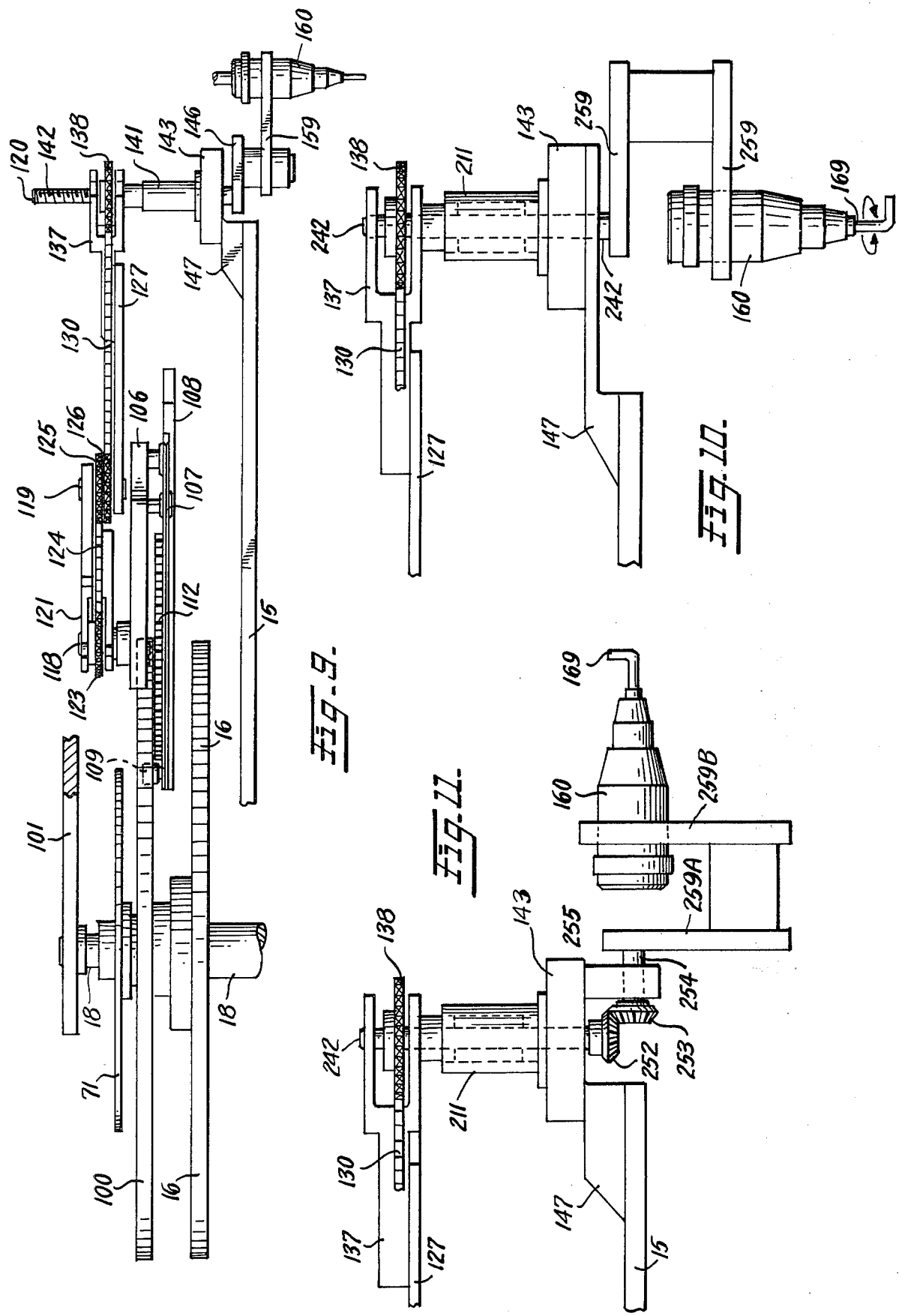

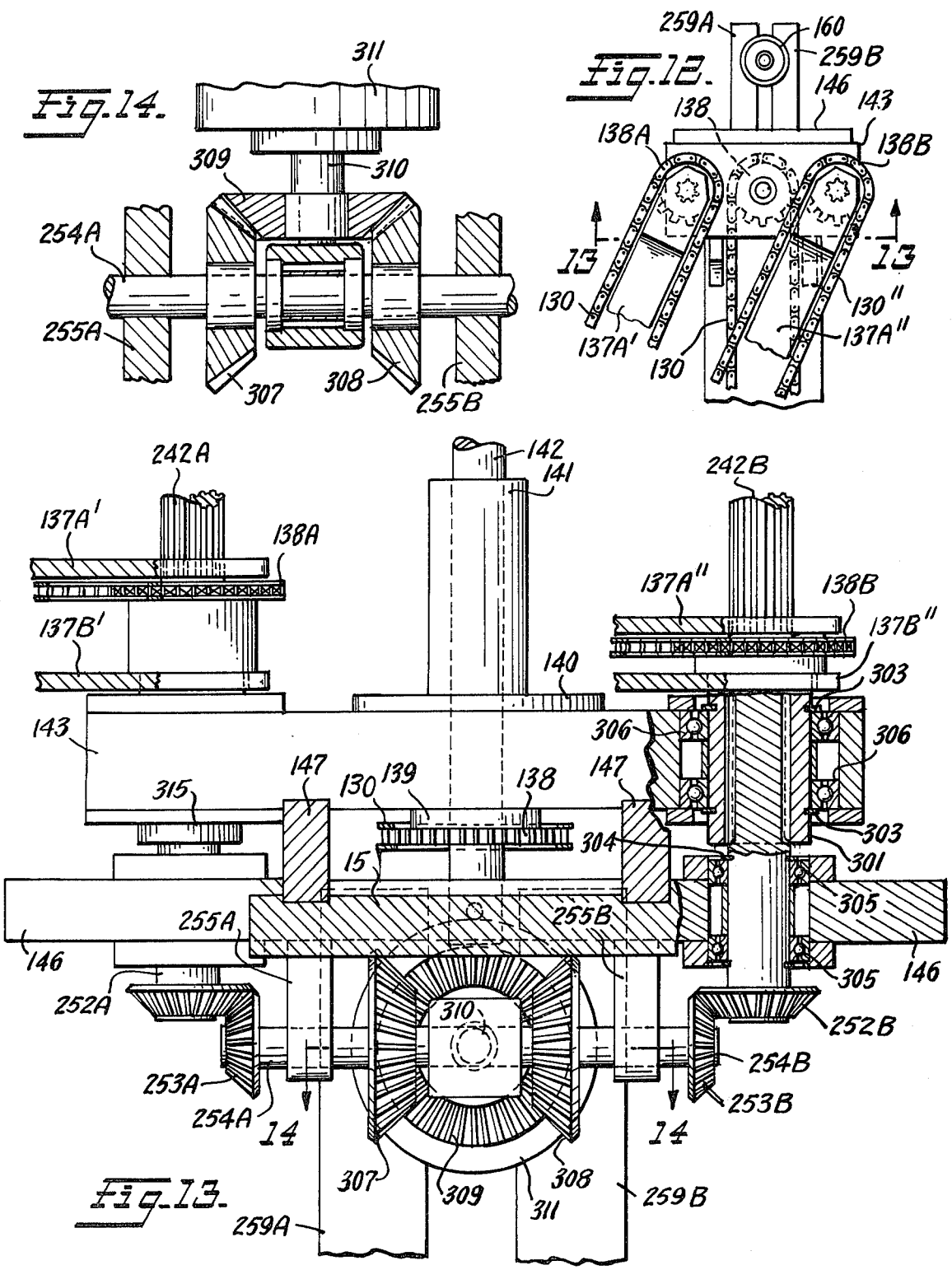

MULTI-DIRECTIONAL MECHANICAL POSITIONING APPARATUS

BACKGROUND OF INVENTION

1. Field of Invention

This invention relates to an all mechanical, cam controlled, automatic positioning mechanism for automatically controlling and moving the working head of a machine tool or the like in a multi-directional manner and which is relatively simple, inexpensive, rugged, substantially maintenance free and dependable in operation.

More specifically, the invention relates to a multi-directional movement either along a Z-axis and/or, cam controlled mechanical positioning apparatus of the same general type as described in U.S. Pat. No. 4,155,272, issued May 2, 1979—Ralph S. Mosher—Inventor—entitled "Low Cost Cam Controlled Positioning Apparatus"—Assigned to Robotics, Inc., and in particular, makes available a mechanism whereby the apparatus is provided with the capability of operating in three dimensions with or without the inclusion of additional degrees of freedom for movement of the working head in pitch, roll and yaw.

2. Background State of the Art

U.S. Pat. No. 4,155,272 describes a two-dimensional movement, cam controlled, all mechanical automatic positioning apparatus for automatically positioning the working head of a machine tool or the like along a predetermined pattern of movement within a two-dimensional (x-y) plane. This invention greatly expands the number of useful applications of the apparatus by increasing the number and nature of controlled movements achievable with the apparatus.

SUMMARY OF INVENTION

The present invention considered in conjunction with the apparatus described in U.S. Pat. No. 4,155,272, makes available to the art an apparatus capable of providing cam-controlled multi-directional, automatic positioning of the working head of a machine tool or the like along any one of three orthogonal directional axes with or without additional controlled movements of the working head in pitch, roll and yaw. The apparatus, while providing highly sophisticated controlled movement over either two-dimensional or three-dimensional spaces, coupled with additional controlled movements of the working head in pitch, roll and/or yaw; nevertheless, is relatively simple, inexpensive, rugged, substantially maintenance free and dependable in operation.

In practicing the invention, a low cost, multi-directional movement, cam controlled mechanical positioning apparatus is provided for automatically tracing out a predetermined path of movement for the working head of a machine tool or the like. The apparatus may be embodied in a single integral machine capable of operation over a three-dimensional space or a two-dimensional plane, coupled with controlled movement of the working head in either pitch, roll and/or yaw. Alternatively, the apparatus may be embodied as an addition to an existing two-dimensional automatic positioning machine whereby controlled movement in a third dimension and/or controlled movement of the working head in pitch, roll and/or yaw can be achieved.

If embodied in a complete machine, the apparatus comprises a set of at least three relatively large diameter disk-type control-drive cams rotatably supported on a base member for controlling movement of the working head of a machine tool or the like within a plane defined by complementary axes of movement and along at least one additional degree of movement. Motor means are mounted on the base member for rotating the control-drive cams at a predetermined speed of rotation and cam follower means engage respective movement inducing cam surfaces formed on respective ones of the control-drive cams. Linkage means are coupled to respective ones of the cam follower means for translating movement of the cam follower means to the working head of a machine tool or the like to thereby move the working head over a predetermined path of movement. A transport mechanism is provided for supporting the working head with the transport mechanism being movably supported on the base member for movement within a plane defined by the complementary axis of movement. The linkage means includes complementary axes of movement inducing linkage means coupled to and driving the transport mechanism within the plane defined by the complementary axes of movement. The remaining linkage means includes transport mechanism follower means coupled to the transport mechanism for freely following movement of the transport mechanism in its plane of movement without interference and additional movement motion transmission means are provided which are responsive to the remaining cam follower means and supported by the transport mechanism follower means for transmitting additional degrees of movement to the working head. In a preferred embodiment, the transport mechanism follower means comprises a swivel jointed pantograph mechanism having the end of one arm swivelly secured to the base member and the end of a remaining arm swivelly secured to the transport mechanism and the plane of movement of the pantograph mechanism is parallel to the plane of movement of the transport mechanism.

The preferred form of the invention further includes elongated boom means having one end secured to the transport mechanism and the working head of the machine tool supported on its remaining free end with the swivel-jointed pantograph mechanism having the end of one arm swivelly secured to the end of the elongated boom means supporting the working head and having the end of a remaining arm swivelly secured to the base member. If desired, mechanical movement amplifying means may be provided for acting on the transport mechanism and amplifying and extending the movement translated to the working head along at least one axis of movement.

A controller-actuator disk is mounted coaxially with the disk-type control-drive cams and further includes electrical encoding means peripherally arrayed around the controller-actuator disk and engagable thereby at certain peripheral points during rotation of the disk whereby electrical control signals are produced for controlling desired auxiliary functions at predetermined points in the path of movement of the working head. The disk-type control-drive cams and the controller-actuator disk preferably are designed so as to be readily removed and replaced with other cams and disks having differently preprogrammed control surfaces formed thereon for producing a different pattern or movement for the working head.

In a preferred form of the apparatus, the linkage means comprises at least one pivoted swinging arc linkage arm having its respective cam follower means engaging an intermediate point thereof between a pivoted end and a swinging arc free end for mechanically amplifying the scope of movement induced by the control-drive cam and cam follower means at the swinging arc free end. The swinging arc free end of the respective linkage arm is connected to the transport mechanism for providing a greater scope of movement to the transport mechanism than the scope of movement of the cam follower means and the contour of the cam surfaces formed in the respective control-drive cams is designed to compensate for the swinging arc movement of the swinging arc free end of the linkage arm in order to convert the movement thereof to substantially rectilinear movement. If desired, certain of the control-drive cams may be designed to include at least two different control cam grooved surfaces formed thereon for producing respective different preprogrammed patterns of movement by the working head of the machine tool and further includes means for selecting desired ones of the control cam grooved surfaces for controlling movement of the apparatus.

The relatively large diameter disk-type control-drive cams are generally circular in shape and have a diameter of the order of 20–40 inches with the control-drive cam surfaces being formed at any point along a radius of the cam whereby the radius defines the full stroke of movement of the cam follower means and substantially greater detail in the formation of the control-drive cam surfaces is achievable by a factor of 4 or 5 to 1 over the detail achieved with the conventional control cam designs. The control-drive cam surfaces comprise grooves formed in corresponding flat surfaces of the disk-type control-drive cams with the grooves being double acting in effect whereby bidirectional control of movement of the cam follower means is achieved. Additionally the flat surfaces of the control-drive cams on which the grooves are formed are downwardly disposed whereby the control-drive cam surfaces are protected from the collection of dirt or other matter and minimal frictional contact resistance with the cam follower means is achieved. The cam follower means, the linkage means and the transport mechanism all are constructed of relatively lightweight, durable material whereby minimum inertia effects are attained and dynamic forces acting on the apparatus are maintained at a low level. The contour of the cam surfaces formed in the respective control-drive cam is designed to include the kinematics of the follower means, the linkage means and the transport mechanism in order to provide a desired motion pattern for the working head and the contour of the control-drive cam surfaces is not identical to the configuration of the path of movement of the working head.

BRIEF DESCRIPTION OF DRAWINGS

The above and other objects, features and many of the attendant advantages of this invention will be appreciated more readily as the same becomes better understood from a reading of the following detailed description, when considered in connection with the accompanying drawings, wherein like parts in each of the several figures are identified by the same reference character, and wherein:

FIG. 1 is a side elevational view of the internal working parts of a multi-directional movement, cam controlled positioning apparatus constructed according to the invention;

FIG. 2 is a plan view of the apparatus shown in FIG. 1;

FIG. 3 is a plan view of a cam follower and rack and pinion arrangement for converting linear motion of a cam follower into rotary motion for transmission through a sprocket wheel and chain drive mechanism and is taken through planar segment 3—3 of FIG. 1;

FIG. 4 is a side elevational view of a portion of the apparatus of FIG. 1 illustrating the details of the connection of a pantograph transport mechanism follower to an elongated boom which is attached to and driven by the transport mechanism of the apparatus in the x-y plane and which supports and moves the working head of a machine tool or the like;

FIG. 6 is a side elevational view taken through planar segment 6—6 of FIG. 5 of the z-axis third dimensional movement translating mechanism for providing third dimensional z-axis movement to the working head of a machine tool such as a dispensing gun and moved by the apparatus of FIGS. 1-5;

FIG. 7 is an end elevational view of the third dimensional (z-axis) movement translating mechanism taken along plane 7—7 of FIG. 6 and illustrates how the mechanism provides third dimensional (z-axis) movement to the working head by converting rotary motion of a chain driven sprocket wheel to linear motion along the z-axis by means of a threaded screw and nut arrangement;

FIG. 8 is a partial plane view of another form of z-axis cam follower and cam follower linkage arrangement for providing orthogonal z-axis motion to a different type of x-y axes planar positioning apparatus according to the invention;

FIG. 9 is a partial side elevational view of the apparatus shown in FIG. 8;

FIG. 10 is a partial end view of a modified form of a positioning apparatus according to the invention which is capable of providing automatic controlled positioning of the working head of a machine tool in yaw (rotational positioning about the z-axis) at any desired point in a predetermined x-y planar path of movement of the working head;

FIG. 11 is a partial end view of still another embodiment of the invention whereby automatic controlled positioning of the working head of a machine tool is provided in either pitch (rotational positioning about the x-axis) or roll (rotational positioning about the y-axis) at any desired point in a preprogrammed x-y planar path of movement of the working head; and FIGS. 12-14 illustrate still a different embodiment of the invention wherein automatic controlled positioning of the working head of a machine tool is provided in an x, y, z three dimensional space together with two additional controlled movement in roll, pitch or yaw.

DETAILED DESCRIPTION OF PREFERRED EMBODIMENTS

Figure 5:
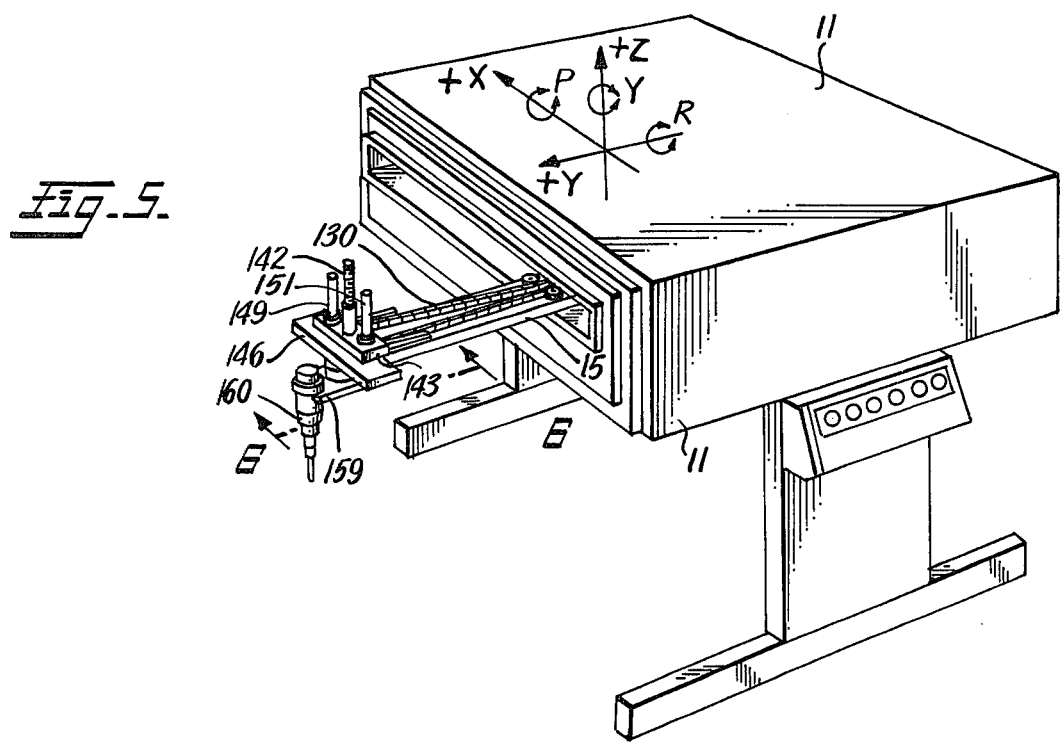
FIG. 5 is a perspective view of a suitable form of outer housing for an apparatus according to the invention showing a working head comprising a dispensing gun mounted on the end of an elongated boom in a manner such that the gun is translatable along x, y and z orthogonal axes and includes a geometric sketch depicting the three orthogonal axes x, y and z which is useful in defining pitch (P), roll (R) and yaw (Y) motions for the working head.

As stated in the foregoing introductory portions of this specification, the present invention provides a cam controlled mechanical positioning mechanism which when added to the cam controlled automatic positioning apparatus described and claimed in U.S. Pat. No. 4,155,272, makes available to the industry a multi-directional movement, cam controlled mechanical positioning apparatus capable of controlled movement either in a two-dimensional plane coupled with controlled movement of the working head in pitch, roll and/or yaw or in a three-dimensional space with or without controlled movement of the working head in pitch, roll and/or yaw. As will be explained more fully hereinafter, pitch is defined to be a rotational movement of the working head around the x-axis, roll is rotational movement of the working head around the y-axis and yaw is rotational movement of the working head around the z-axis at any given point in the path of movement of the working head. Thus, it will be appreciated that the invention makes available an all mechanical, cam controlled positioning apparatus which possesses considerable flexibility in adapting to the needs of a particular use application, but which, nevertheless, is relatively simple, inexpensive, rugged, substantially maintenance free and dependable in operation.

FIG. 1 is a partial, side sectional view taken along the y-axis of a multi-directional, cam controlled, mechanical positioning apparatus according to the invention wherein the apparatus is capable of controlled positioning of the working head of a machine tool or the like at any point within a three-dimensional space defined by the scope of movement of the apparatus along orthogonal x, y and z axes of movement. In order to facilitate this description, only those portions of the apparatus which are being added to the two-dimensional planar positioning apparatus described in U.S. Pat. No. 4,155,272, will be described in detail together with the manner in which they coact with the previously described planar positioning mechanism of U.S. Pat. No. 4,155,272. To the extent possible reference numerals have been employed in the drawings of the present application which correspond to the reference numerals of similar parts described in U.S. Pat. No. 4,155,272. For a more detailed description of the construction and manner of operation of the cam controlled x-y planar positioning mechanism, reference is made to the disclosure of U.S. Pat. No. 4,155,272 the teachings of which are hereby incorporated into the disclosure of this application in their entirety. However, for the purpose of facilitating this description and an understanding thereof without undue cross referencing to copending U.S. Pat. No. 4,155,272, the following brief description of the two axes, planar cam controlled positioning mechanism is provided.

As shown in FIG. 1, the apparatus includes an x-axis control-drive cam 17, a y-axis control-drive cam 16, a z-axis control-drive cam 100 and an actuator disk 71 all arrayed in parallel planes on a common drive shaft 18 which is driven by an electric motor 19 through a suitable gearing arrangement shown at 20 at a constant speed. As explained more fully in U.S. Pat. No. 4,155,272 each of the control-drive cams for the x, y and z axis, respectively, comprise relatively large diameter disk cams having double sided control groove surfaces machined into their lower side. The entire peripheral contour of the control groove surfaces defines a desired path of movement for the working head of a machine tool being controlled along the x, y or z axis, respectively. Thus, as the common drive shaft 18 is rotated at a constant speed, the x-axis cam follower, the y-axis cam follower and the z-axis cam follower 109 are caused to move in a pattern dictated by the contour of the control groove surfaces formed in the undersides of the respective control-drive cams. The movement of the cam followers then is transmitted through suitable linkages to a transport mechanism and follower arrangement whereby the machine tool working head is caused to reproduce a preprogrammed three-dimensional path of movement. The control groove surfaces formed in the undersides of the control-drive cams have been formed pursuant to conventional control cam surface fabrication technology in a manner so as to compensate for the kinematics of the linkage and transport mechanism systems whereby the desired pattern of movement of the working head of the machine tool is achieved. Coincident with rotation of the control drive cams, actuator disk 71 operates in conjunction with electrical encoding means comprised by micro-switches such as the one shown at 73 in FIG. 1 to turn on and off a dispensing gun, etc.

The y-axis cam follower shown at 23 in FIG. 2 is mounted on a linkage arm 27A intermediate a linkage arm pivot shaft 74 and the swinging arc end of the linkage arm 27A which is connected by a pivot 75 to an intermediate coupling link 27B. The intermediate coupling link 27B in turn is pivotally connected to a rectangular plate-shape y-axis linkage member 27C. As shown in FIG. 1, the y-axis linkage member 27C has V-shaped tracks secured to its outer edges which ride in and support complementary V-shaped support wheels 30 that are rotatably mounted on pedestal supports secured to a Y carriage member 33. By reason of this interconnecting linkage arrangement, as viewed in FIG. 2, the cam follower 23 and linkage arm 27A are constrained to move up or down within the plane of the paper between the lower and upper limits as shown by arrows 27A' and 27A". Accordingly, the linkage arm 27A will cause the linkage coupling 27B to move up or down within the plane of the paper an additional or amplified distance relative to the scope of movement of cam follower 23 as determined by the length of the lever arm defined by coupling link 27A. Movement of 27B is coupled to movement of the y-axis linkage member 27C up or down a corresponding distance within the plane of FIG. 2 or into and out of the plane of the paper as shown in FIG. 1. The Y carriage member 33 shown in FIG. 1 has an elongated boom member 15 secured to it, and the elongated boom member in turn supports the working head 160 of a machine tool or the like at its free end as shown in FIG. 5. It will be appreciated from the above brief description, that controlled movement of the working head of the machine tool along the y-axis is achieved in the above briefly described manner as dictated by the contour of the control groove cam surfaces formed in the underside of the y-axis control-drive cam 16.

As shown in FIG. 1 the elongated boom member 15 has secured to the lower outer edges of a portion thereof suitable V-shaped tracks which ride in and are supported by complementary V-shaped rotatable wheels 37. The wheels 37 in turn are rotatably supported on pedestals secured to and riding on an x-axis carriage member 45. The x-axis carriage member 45 on its undersurface has a second set of support pedestals on which x-axis carriage support wheels 46 are mounted in a freely rotating manner. The wheels 46 coact with and are supported by complementary V-shaped track elements 47 secured to the base member 11 which in turn may comprise a part of the housing of the apparatus.

As best seen in FIG. 2, the x-axis carriage member 45 is pivotally secured to a connecting link 76C which in turn is connected by a pivotal coupling point 76B to a swinging arc linkage arm 76A. The swinging arc linkage arm 76A is pivotally supported at one end by a pivot post 77 and at the remaining, free, swinging arc end is coupled to the linkage arm 76C at the coupling point 76B. An x-axis movement inducing cam follower 24 is mounted on the swinging arc linkage arm 76A at a point intermediate the pivot post 77 and the free swinging end of the linkage arm connected by coupling point 76B to the linkage member 76C. By this construction, rotation of the x-axis, large diameter, disk-type control-drive cam 17 (see in FIG. 1) will cause the cam follower 24 to move linkage arm 76A right or left as shown by arrows 76A' and 76A" depending upon the contour of the grooved control cam surface on x-axis control-drive cam 17 thereby causing the free swinging arc end of linkage arm 76A to move the x-axis carriage base member 45 right or left along the x-axis through the medium of track 47 and support rollers 46. In this manner, controlled movement of the elongated boom member 15 along the x-axis is achieved.

From the foregoing brief description, it will be appreciated that the x-axis carriage member 45 and the y-axis carriage member 33 together with their attendant support wheels 30, 37 and 46 comprise a transport mechanism for causing the elongated boom member 15 on which the working head of a machine tool or the like is mounted, to move over a controlled path within an x-y plane defined by the scope of movement of the transport mechanism within the orthogonal, complementary x-y axes of movement. The present invention makes available a mechanism for adding an additional controlled degree of movement either along the z-axis orthogonal to the x and y axes, and/or controlled movement of the working head of a machine tool or the like in pitch, roll and/or yaw. In the embodiments of the invention shown in FIGS. 1–7, an additional, controlled degree of movement along a z-axis orthogonal to the previouly defined plane of movement in the orthogonal, complementary x and y axes, is provided.

To control movement for the working head of a machine tool or the like supported on the end of the elongated boom member 15, as mentioned briefly above, the z-axis control-drive cam 100 shown in FIG. 1 is provided. The z-axis control-drive cam 100 is keyed to the common drive shaft 18 and is mounted in a plane parallel to the x and y axis control-drive cams 16 and 17 as shown in FIG. 1. A z-axis motion transmission arrangement is provided for converting the z-axis control-drive information contained in the contour of the control grooves formed in the underside of the z-axis control-drive cam 100, into controlled motion of the working head of the machine tool or the like along the z-axis in a complementary and non-interfering manner with respect to the x and y axis planar movement whereby controlled three-dimensional movement of the working head is achieved. For this purpose, the arrangement is supported on an upper hanger member 101 that in turn is secured to and supported by a top member 102 of base member 11 in which the rotatable shaft 18 is journaled and which comprises the upper part of the base member or housing structure 11 for supporting pivot posts 74 and 77 in place along with shaft 18. Lateral support to the upper hanger member 101 is provided by a lateral support member 103 shown in FIG. 1 and which extends between the sides of the base member or frame of the housing structure 11 in which the apparatus is supported. A pair of vertical support members 104 and 105 are secured to and depend from the upper hanger member 101 and support a bottom mounting plate 106. The bottom mounting plate 106 has a set of four pedestals secured to its underside on which z-axis carriage support guide wheels 107 are rotatably mounted as best shown in FIG. 3. The guide wheels 107 have V-shaped male peripheries which coact with complementary V-shaped female tracks secured to the side of a z-axis carriage plate member 108. The z-axis carriage plate 108 has secured to its right-hand end the z-axis cam follower 109 which rides in and moves to the right or left from the position shown according to the contour of the control grooves shown by dotted lines at 110 formed in the underside of the z-axis control drive cam 100. Accordingly, it will be appreciated that the control information designed into the contour of the control groove surfaces 110 in the z-axis control-drive cam is directly converted to linear movement of the z-axis carriage plate right or left as shown in FIGS. 1 and 3.

In order to convert the right or left movement of the z-axis carriage plate 108 into corresponding z-axis controlled movement of the working head of the machine tool or the like supported at the end of the elongated boom 15, z-axis linkage means are provided. The z-axis linkage means is in fact comprised by an x-y axes transport mechanism follower means together with a z-axis movement motion transmission means, both of which means will be described more fully hereinafter. Briefly, however, it can be stated that the transport mechanism follower means comprises a means for effectively bridging or coupling the z-axis motion to the x-y axes motion of the x-y axes transport mechanism without interfering with the movement of that mechanism within its designed plane of movement. The z-axis movement motion transmitting means comprises a means for effectively transmitting the motion of the z-axis carriage plate member 108 over the bridging or coupling provided by the x-y axes transport mechanism follower means to the working head of the machine tool or the like supported at the end of the elongated boom member 15 which of course is supported by and moves with the x-y axis transport mechanism.

The transport mechanism follower means is comprised by a swivel-jointed pantograph mechanism including a first pantograph linkage arm 122 swivelly secured to the upper hanger member 101 (which comprises a part of base member 11) at a swivel joint axis 118. The remaining end of the first pantograph linkage arm 122 is swivelly secured to a second pantograph linkage arm 127 at a movable swivel joint 119 with the remaining end of the second pantograph linkage arm 127 being swivelly secured to the transport mechanism at a swivel joint axis 120 located along the elongated boom 15 in the vicinity of the connection of the elongated boom to the x-y axis transport mechanism. The articulated pantograph linkage arms 122 and 127 thus provide a transport mechanism follower means for following the motions of the elongated boom on which the working head of the machine tool or the like is supported and allows for freedom of movement of such parts in the x-y plane without interference from the transport mechanism follower while providing a means whereby z-axis controlled motion can be coupled to the working head.

The z-axis movement motion transmitting means for transmitting the z-axis movement induced in the z-axis carriage plate member 108 by the z-axis cam follower 109 during rotation of the z-axis control-drive cam 100, is comprised in part by a rack and pinion arrangement 112 and 113 best seen in FIGS. 1 and 3. A gear-toothed rack 112 is secured to one side of the z-axis carriage plate member 108 and moves with this member. A pinion wheel 113 is keyed to a shaft rotatably journaled in the bottom mounting plate 106 and the upper hanger member 101 and also keyed to and drives a sprocket wheel 114 that in turn drives a chain 115. The chain 115 is stretched between the driving sprocket wheel 114 and a first driven sprocket wheel 116 keyed to a rotatable shaft centered on a pivot axis 118 and journaled by suitable bearings between upper hanger member 101 and bottom mounting plate 106. To maintain proper tension on the chain drive 115, an idler sprocket wheel 117 is rotatably supported by a shaft journaled in bearings supported by the upper hanger member 101. Preferably, a conventional, commercially available torque limiter device shown at 110 is provided on the shaft coupling between pinion wheel 113 and drive sprocket wheel 114. For this purpose a Browning torque limiter No. T2L driving a sprocket 35T25L35 may be employed. Sprocket wheel 116 is keyed to a rotatable shaft journaled in bearings supported by the upper hanger member 1 and bottom mounting plate 106 and having a center axis 118. A second sprocket drive wheel 123 is keyed to shaft 118 as best seen in FIGS. 1 and 3 of the drawings and rotatably mounted between the fingers of a longitudinally adjustable, pivotally mounted bifurcated yoke member 121 secured to and supporting one end of the first pantograph linkage arm 122. By this arrangement, both the second drive sprocket wheel 123 and the first pantograph linkage arm 122 are allowed to rotate or swivel about the center axis 118. It will be appreciated also that the end of the first pantograph linkage arm 122 is in fact swivelly supported on the upper hanger member 101 which comprises a part of the base member 11 or housing of the structure.

Figure 4:
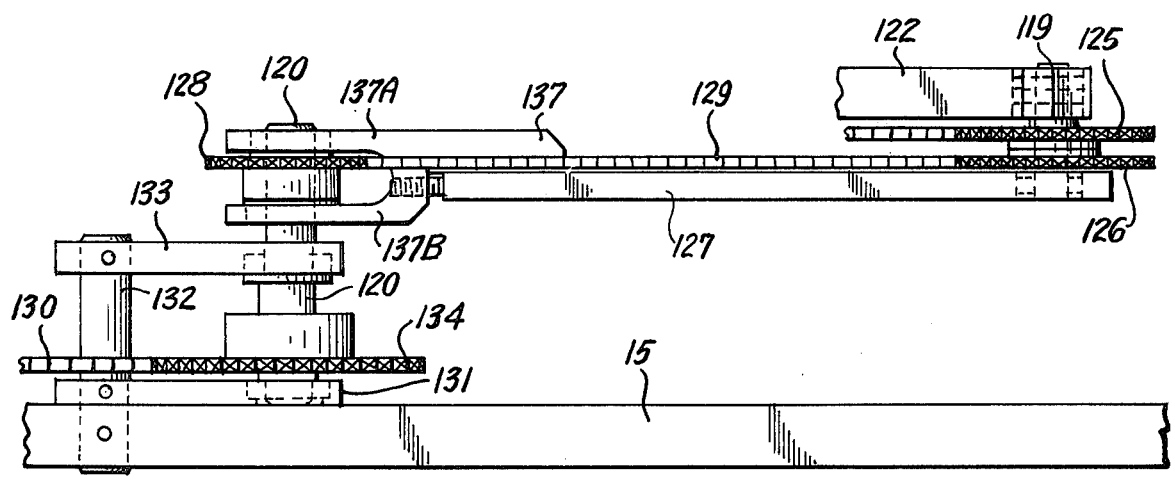

Rotation of the second drive sprocket wheel 123 is transmitted through a second chain 124 to a second driven sprocket wheel 125 rotatably mounted on the opposite end of the first pantograph linkage member 122. Longitudinal positioning of the yoke member 121 maintains tension of the chain 124. As best seen in FIG. 4 of the drawings, the second driven sprocket wheel 125 rotates about a center axis 119 which is the common pivotal axis for the first and second pantograph linkage members 122 and 127, respectively and is freely movable in space within a plane parallel to the x-y axes plane of movement of the transport mechanism as shown at 119, 119' in FIG. 2. Sprocket wheel 125 is mounted coaxially with a third drive sprocket 126 and is solidly connected to a common rotatable drive shaft centered on axis 119 so that sprocket wheel 126 rotates in response to rotation of driven sprocket wheel 125. Sprocket wheel 126 in turn is coupled to and drives a chain 129 linked with a third driven sprocket wheel 128 rotatably mounted at the remaining end of the second pantograph linkage member 127.

FIG. 4 is a partial side elevational view taken through planar segment 4—4 of FIG. 2 showing the end of the second pantograph linkage member 127 at the point where it is swivelly supported by elongated boom member 15. The point of support of pantograph linkage member 127 to elongated boom member 15 is in the locale of the place of connection of boom member 15 to the x-y axes transport mechanism so that in effect it can be said that the end of linkage member 127 is swivelly secured to the x-y axes transport mechanism. The end of the second pantograph linkage member 127 has a longitudinally adjustable bifurcated yoke member 137 including parts 137A and 137B in which suitable bearings are seated for journaling a rotatable shaft centered about the axis 120. The third driven sprocket wheel 128 is keyed to the shaft 120 and is rotated by the drive chain 129 as described in the preceding paragraph. Shaft 120 is supported on the elongated boom member 15 by an outer support plate 131 in which suitable bearings are seated for rotatably supporting the lower end of shaft 120. The outer support plate 131 has secured to it two vertical support rods 132 which support an upper outer support plate 133 also seating bearings for journaling the shaft 120. Preferably, suitable guide slots and screw nut fasteners are provided for the vertical support rods 132 to allow the entire structure including the shaft 120 to be longitudinally adjusted along the length of the boom 15 and second pantograph linkage member 127 to maintain tension on the drive chain 129. The height of the multi-finger coupling yoke members 121 and 137 provide vertical rigidity to the articulated pantograph linkage.

The rotatable shaft 120 has keyed to its lower end a fourth driving sprocket wheel 134 which, because of the above-described mechanisms, rotates only as a function of the "z-axis" motion requirements under the control of the z-axis control-drive cam 100, and this rotary motion is transmitted to the end of the elongated boom member 15 by means of chain 130. Tension and lateral stability of chain 130 along the length of the elongated boom member 15 is achieved by means of double chain tighteners of known construction which may be supported along the length of the elongated boom 15 at strategic locations for maintaining tension of chain 130.

At the outer working end of the elongated boom member 15, as best shown in FIGS. 6 and 7 of the drawings, the "z-axis" motion transmitted through chain 130, is applied to a fourth driven sprocket wheel 138. Sprocket wheel 138 is rotatably supported on a shaft 142 which is in fact a threaded screw stud that coacts with a complementary threaded screw nut arrangement 141 for causing the stud 142 to be raised or lowered in the vertical "z" axis direction. For this purpose, a "z-axis" motion inducing plate 143 is secured to the end of the elongated boom member 15 by supports 147. Mounted on the plate 143 are two linear ball bushings or sliding bushings 150 which slidably support and guide vertical motion guide bars 149 and 151. A vertical motion output plate 146 is secured to the ends of the vertical guide bars 149 and 151 and to the end of the threaded screw stud 142 as best seen in FIG. 7. The sprocket wheel 138 is fastened to the threaded worm screw nut 141 by means of a clamping disk 139 which directly connects sprocket wheel 138 to the inner ring of a ball bearing arrangement 145 and a worm screw nut retainer ring 140 that in turn is directly connected to the worm screw nut 141. The outer ring of the ball bearing arrangement 145 is secured to the vertical motion inducing base plate 143 by means of a retainer ring 144. Through this arrangement, vertical motion of the vertical motion output plate 146 is caused by rotating sprocket wheel 138 in accordance with the desired z-axis motion as derived in the manner described previously. Rotational motion of sprocket wheel 138 results in directly rotating the threaded worm screw nut 141 which in turn causes the threaded screw stud 142 to move the entire assembly comprising the vertical output plate 146 and guide bars 149 and 151 up or down along the vertical z-axis.

As best shown in FIG. 6 of the drawings, the z-axis vertical motion output plate 146 is directly connected by means of a mounting bracket 159 to a dispensing gun 160 or other suitable machine tool for effecting the work to be done by the apparatus. As previously disclosed, the dispensing gun 160 will be positioned automatically at a desired point within an x-y plane by the elongated boom member 15 due to the x-y positioning of the x-y axes transport mechanism which supports and moves the elongated boom 15 in the x-y plane in the previously described manner. Vertical positioning of the dispensing gun along the z-axis at any predetermined point in the x-y plane will be in accordance with the dictates of the positioning information designed into the control groove cam surfaces on the z-axis control-drive cam 100. Rotation of the cam 100 causes the cam follower 109, z carriage plate 108, gear-tooth rack 112 and pinion 113 to rotate the first driving sprocket wheel 114 by an amount and in a direction dictated by the control information contained on the z-axis cam groove surfaces. This z-axis motion then is transmitted through the chain drive 115 and intervening chain drives 124, 129 and 130 to cause rotation of the sprocket wheel 138 and worm screw nut 141 in the above-described manner to position the dispensing gun working tool at a desired point within the three-dimensional space defined by the scope of movement of the apparatus.

The pantograph linkage mechanism comprised by the pantograph linkage members 122 and 127 allows transmission of the z-axis motion independently of the x and y motions and without interference between these independently derived motions. The mechanism gives ideal control of velocity and movement in any direction within the x, y, z coordinate system. For example, if the working tool is required to provide a constant velocity movement over a variety of paths and then be required to move in a direction equal to the diagonal of a cube, each of the respective x, y and z-axis control-drive cams must transmit a velocity of 0.5773 of the required velocity for the diagonal scribe. Another example of the type of movement achievable with the mechanism would involve a cubical space having the x-axis movement one unit long, the y-axis two units long and the z-axis three units long and it is required that the working head of the machine tool scribe the diagonal of this space at a specific constant velocity. Under such constraints, the x-axis cam would need to transmit 0.2673, the y-axis cam 0.5345 and the z-axis cam 0.8018 of the specific velocity required to travel the diagonal of such a space. As a third example, if the working head of the machine tool is required to travel in the direction of only one of the orthogonal coordinates x, y or z, the related x, y or z cam would transmit all of this motion and the remaining two cams would cause no motion at all. These are simple examples merely for the purpose of illustration for the apparatus is in no way limited to use with such simple movements but can achieve circles, spirals, or any other desired geometric shape with control of the velocity of the working head during movement over such shaped paths.

From FIG. 2 of the drawings the envelope of motion in the x-y plane which the transport follower pantograph mechanism is free to follow can be visualized. This envelope of motion is dictated by the scope of movement of the x-y axis transport mechanism in the x-y plane and for one specific example amounts to an area of 17 inches by 21¼ inches. The transport follower pantograph linkage mechanism is shown in solid lines in an intermediate position and in phantom in an extreme position. The kinematics and proportioning of the pantograph linkage members 122 and 127 is designed to optimize the area of motion obtained for the linkages used and at the same time, keep linkage transmission angles from becoming too small and hence constituting a threat to the operational integrity of the z-axis motion transmitted information.

FIGS. 8 and 9 of the drawings illustrate the basic z-axis motion transmitting mechanism applied to a different form of x-y axes planar positioning machine where in the x and y axis motions are transmitted directly from the respective x and y axis control-drive cam followers through direct driver links. A detailed description of the construction and operation of this different form of x-y axis planar positioning mechanism is set forth with respect to FIGS. 1-6 of the above-identified U.S. Pat. No. 4,155,272 and for a more detailed description of this portion of the mechanism, reference is made to copending U.S. Pat. No. 4,155,272. FIGS. 8 and 9 do not employ a rack and pinion motion amplification arrangement as described in U.S. Pat. No. 4,155,272, although such motion amplification feature could be included if desired. These figures, however, illustrate the adaptability of the z-axis motion transmission mechanism to almost any form of planar x-y motion generating device whether it be one of the types described in U.S. Pat. No. 4,155,272 or any other known type of automatic x-y planar positioning device. The fundamental requirement is that the z-axis control-drive cam rotation be synchronized in motion with respect to the x-y axis driving devices which means that for any one given x-y planar position of the positioning device, there is a specific location on the z-axis control-drive cam. This synchronization of motion along the z-axis can be done directly as illustrated in this application or it can be done indirectly through other mechanical, electro-mechanical or servo methods. Another important distinction of the species of the invention shown in FIGS. 8 and 9 is that it employs a greatly simplified z-axis motion transmission scheme whereby a number of interconnecting sprocket wheels and drive chains can be eliminated. This is made possible by the reduction in scope of movement within the x-y plane possible with the linear motion type of x-y planar positioning mechanism shown in FIGS. 8 and 9. To accommodate greater scopes of movement, additional components and elements, such as were described with respect to FIGS. 1-5 of the drawings, may be required.

The embodiment of the invention shown in FIGS. 8 and 9 again includes a z-axis, large diameter, control-drive cam 100 which is mounted on a common drive shaft 18 in parallel with the x and y axes control-drive cams 16 and 17 (not shown) and rotated in synchronism therewith. A z-axis carriage plate member 108 supports a cam follower 109 which engages and is moved by the grooved control cam surfaces formed in the underside of the z-axis control-drive cam 100. Z-axis motion imparted to the cam follower 109 moves the z-axis carriage plate member 108 right or left from the intermediate position shown in FIGS. 8 and 9 thereby causing a gear-toothed rack (shown in dotted outline form at 112) mounted on and riding with the carriage plate 108 to engage and rotate a pinion gear 113. The pinion gear 113 in turn is keyed to a shaft 118 journaled in a bottom mounting plate 106 secured by suitable vertical support members (not shown) to the hanger member 101 (not shown) comprising a part of the base member or housing in which the mechanism is mounted. By this arrangement, linear movement of the z-axis carriage plate member 108 either right or left from the intermediate position shown in FIGS. 8 and 9 is translated to rotary motion of the pinion gear wheel 113 representative of the desired z-axis motion of the working head.

In order to convey the z-axis motion imparted to the rotary pinion gear 113 to the working head of a machine tool or the like mounted at the remote or free end of the elongated boom member 15, a transport mechanism follower means in the form of a set of swivel-jointed pantograph linkage members 122 and 127, is provided. In the embodiment of FIGS. 8 and 9, the first pantograph linkage member 122 is swivelly mounted on the shaft 118 by means of an extensible, bifurcated yoke mounting member 121 capable of being extended longitudinally. The remaining end of the first pantograph linkage member 122 is swivelly secured to one end of a second pantograph linkage member 127 having a longitudinally extensible, bifurcated yoke mounting member 137 adjustably secured to its remote end. The yoke mounting member 137 in turn is swivelly secured to rotate about the center axis 120 of a threaded screw rod 142 to be described more fully hereinafter. The yoke support member 137 is secured to and supported by a threaded screw nut assembly 141 which is complementary shaped to receive a threaded screw 142 and is physically supported by a z-axis motion inducing support plate 143 secured by mounting members 147 to the remote end of the elongated boom member 15. By reason of this arrangement, the transport mechanism follower pantograph linkage comprised by members 122 and 127, will follow the movements of the end of the elongated boom member 15 within the scope of movement thereof in the x-y plane similar to the embodiment of the invention described with relation to FIGS. 1–5. It should be noted, however, that in the arrangement of FIGS. 6 and 7, the end of the second pantograph linkage member 127 is swivelly secured to the end of the elongated boom member 15 remote from the x-y axis transport mechanism which is connected to and drives the elongated boom member 15. Accordingly, it will be appreciated that as the elongated boom member 15 which supports the working head of a machine tool or the like, is caused to move over a preprogrammed path of movement in the x-y plane, the transport mechanism follower pantograph linkage will follow the x-y movement and allow z-axis motion to be coupled to the working head of the machine tool independently of the x and y motions and without interfering with the x-y axes movement. This is possible because the double pantograph linkage is a differential mechanism providing articulation of the linkage members 22 and 27 about their respective swivel axes without causing rotation of the z-axis movement motion transmitting sprocket wheels 123, 125 and 128, to be described more fully hereinafter.

Returning again to the pinion gear 113, it has been established that rotation of this pinion gear corresponds to desired motion of the working head along the z-axis. In order to transmit this motion to the working head, the pinion gear 113 is keyed to a common shaft centered along the axis 118 with a first drive sprocket wheel 123. Accordingly, sprocket wheel 123 rotates in synchronism with the pinion gear 113 and transmits this motion through a drive chain 124 to a driven sprocket wheel 125 rotatably mounted at the end of the first pantograph linkage member 122 on a common shaft with a second drive sprocket wheel 126. The sprocket wheels 125 and 126 are keyed to a common shaft centered on the axis 119 which also identifies the axis of rotation of the swivel-jointed pantograph linkage arms 122 and 127. Sprocket wheel 126 is coupled through drive chain 129 to a second driven sprocket wheel 138 rotatably mounted at the remaining end of the pantograph linkage arm 127 by means of the adjustable mounting yoke member 137. Longitudinal adjustments of the mounting yoke members 121 and 137 provide means for maintaining tension of the drive chains 124 and 127, respectively.

An end assembly similar to that of FIGS. 6 and 7 is comprised by the sprocket wheel 138 which is mechanically coupled to and rotates a threaded screw nut assembly 141 rotatably supported in suitable bearing arrangements on a z-axis motion inducing support plate 143. The support plate 143 is in turn firmly mounted by support members 147 to the working end of the elongated boom member 15. The threaded screw shaft 142 is centered on the axis 120 and is secured to a working member support plate 146 which screw shaft 142 moves vertically up and down along the z-axis. The working member support plate 146 has a dispensing gun or other similar machine tool working device secured to it by means of mounting bracket 159. As a result of this arrangement, rotation of the chain driven sprocket wheel 138 due to the z-axis motion transmitted thereto by rotation of the pinion gear 113 via the intermediate sprocket wheels 123, 125 and 126, causes the threaded screw nut assembly 141 to rotate. This in turn causes the threaded screw shaft 142 to either raise or lower the vertical motion output plate 146 thereby raising or lowering the dispensing gun 160 along the z-axis. Similar to the arrangement shown in FIGS. 6 and 7, movement of the vertical motion output plate 146 may be guided by linear ball bearing bushings or plain bushings and guide posts supported by the plate member 143. FIG. 8 of the drawings, illustrates the overall dimensions of the mechanism by lines 171 for a machine approximately 33 inches wide by 38 inches long in the x-y plane and providing an envelope of movement approximately 9 inches by 9 inches in dimensions. The scope of movement in the vertical or z-axis plane which is into or out of the plane of the paper as viewed in FIG. 8, will be determined by the relative length of movement allowed by the threaded screw nut assembly 141 and its complementary threaded screw shaft 142. These items are commercially available items, and can be designed to provide for a fairly extensive range of movement in the vertical or z-axis of the order of 6 to 9 inches. The scope of movement provided for the mechanism can of course be increased or for that matter decreased by appropriate redesign of the dimensions of the elements herein described.

The present invention is not limited in its application to a machine for providing controlled movement in a three-dimensional space but in fact can be applied as a multi-directional motion mechanism capable of providing not only three-dimensional movement to the working head of a machine tool or the like but also to provide additional degrees of movement such as pitch, roll and/or yaw. FIG. 5 of the drawings includes a geometrical sketch illustrating the layout of three orthogonal axes of movement x, y and z in space. While the orientation of these three orthogonal axes may be adjusted to accommodate any given machine tool application, they are illustrated in the manner shown in order to establish a criteria whereby additional degrees of movement can be defined. For this purpose, rotation of an object about the x-axis identified by the arrows labeled P will be defined as pitch, rotation about the y-axis as indicated by the arrows labeled R is defined as roll, and rotation about the z-axis identified by the arrows labeled Y is defined as yaw.

FIG. 10 is a partial elevational end view of still a different embodiment of the invention wherein an additional degree of movement in the form of yaw control is provided. In the embodiment of the invention shown in FIG. 10, an additional control-drive cam similar to the cam 100 of the species of the invention shown in FIGS. 1 and 6 will be provided together with a cam follower and rack and pinion motion transmitting sprocket wheel and chain drive arrangement identical in all respects to either of the species of the invention previously described and differing therefrom only in the nature of the information which is designed into the contour of the control groove cam surfaces formed in the underside of the additional, large diameter, control-drive cam. In the embodiment of the invention shown in FIG. 10, the control groove cam surfaces will be formed to provide yaw (rotation of the working head of the machine tool around the z-axis) at particular desired points during the path of movement of the working head within the x-y plane. By reason of this arrangement, it will be appreciated that rotation of the sprocket wheel 138 rotatably mounted at the end of the second transport follower pantograph linkage member 127, will be representative of the desired z-axis rotational positioning (yaw) of the working head 160 of the machine tool at any particular corresponding point in the planar path of movement of the working head 160 due to the movement thereof by the x-y axis transport mechanism and elongated boom 15 on which the working head is mounted.

The sprocket wheel 138 is keyed to a shaft 242 that in turn is rotatably supported by bearings seated in the fixed support plate 143 secured by support members 147 to the end of boom 15 and in the adjustable end yoke member 137 supported by the end of the second pantograph linkage member 127. The bearings are seated in a suitable bearing housing structure 211 for providing both vertical and lateral rigidity to the assembly. Rotation of the shaft 242 by the sprocket wheel 138 is transmitted to the mounting brackets 259 for the dispensing gun or other working head device or machine tool. As illustrated in FIG. 10, the mounting brackets 259 are offset and hold a dispensing gun 160 in such a manner that a right angled nozzle 169 provided for the gun can be rotated through a 360° arc about the z-axis in the manner shown by the arrow Y through rotation of the entire assembly comprising dispensing gun 160, brackets 259, shaft 242 and sprocket wheel 138 thereby providing controlled positioning of the dispensing gun in yaw as well as in x-y axes planar path positioning.

FIG. 11 is a partial, elevational view of the end of still a different embodiment of the invention wherein means are provided for controlling positioning of the working head of a machine tool or the like such as a dispensing gun in roll as defined with relation to FIG. 5. In FIG. 11 like parts to those described with relation to FIG. 10 have been identified by the same reference number. In the FIG. 11 embodiment, the shaft 242 is rotatably supported within a bearing housing 211 seated on the support plate 143 secured to the end of elongated boom 15 by support members 147. Rotation of the sprocket wheel 138 which is keyed to the rotatably supported shaft 242 corresponds to the desired degree of roll (rotational positioning about the y-axis) of the nozzle 169 or tip of the dispensing gun 160. Rotation of sprocket wheel 138 in FIG. 11 will have been derived from a suitably designed control-drive cam used to transmit roll control motion via the transport mechanism follower linkage mechanism and series of pinion gear and sprocket wheel and chain drive arrangements similar to those shown in previously described figures. In the embodiment of FIG. 11, the rotatable shaft 242 is secured to and rotates a first bevel or miter gear 252 that meshes with a second miter gear 253 displaced 90° from the first bevel gear 252. Miter gear 253 is secured to and drives a shaft 254 that is rotatably supported in suitable bearings within a depending support member 255 secured to the underside of the support plate 143. Shaft 254 also is secured to one of the two offset mounting brackets 259A and 259B supporting the dispensing gun 160. Rotation of the shaft 254 due to the rotation of the intermeshing double miter gears 252 and 253 causes rotation of the crank arm formed by the two offset mounting brackets 259A and 259B about the shaft 254 as a center thereby rotating the tip or nozzle 169 of dispensing gun 160 to any desired angular position over a full 360° range. Rotation of the dispensing gun 160 in this manner provides controlled positioning of the nozzle 169 in roll as indicated by the arrows R defined with relation to FIG. 5. Control of the angular positioning of the tip 169 in roll is of course synchronized with movement of the dispensing gun within the x-y plane by the elongated boom member 15 and x-y axis transport mechanism to which the boom 15 is secured as described previously.

It is believed obvious from a consideration of FIG. 11 that by so orienting the axis of the shaft 254 so that it extends into and out of the plane of the paper as shown in FIG. 11, controlled rotation of the tip 169 of dispensing gun 160 in pitch (rotational positioning about the x-axis) can be achieved. This can be readily accomplished with the arrangement of FIG. 11 by locating the second double or miter gear 253 so that its plane is parallel to the plane of the paper in FIG. 11 and of course appropriately moving the location of the depending support member 255 secured to the side of the support plate 143 so that the shaft 254 becomes centered on the x-axis. It will be appreciated therefore that FIGS. 10 and 11 of the drawings illustrate variations of the basic invention whereby controlled motion of the working head of a machine tool or the like in either pitch, roll and/or yaw can be achieved.

In view of the foregoing description, it is believed obvious to one skilled in the art that the embodiments of the invention disclosed readily can be modified to provide controlled movement of the working head of a machine tool or in the like along any one of three dimensional axes of movement and that if additional desired degrees of movement in either roll, pitch or yaw is desired, the basic mechanisms can be modified to provide such additional degrees of movement. For example, in the embodiments of the invention shown in FIGS. 1 and 6, by the addition of a second x-y transport mechanism follower pantograph linkage arrangement and the use of suitable dual supports at the end of the elongated boom, the three-dimensional apparatus therein described readily could be modified to include the additional controlled movements in either roll, pitch or yaw. Alternatively, only a single x-y transport mechanism follower pantograph linkage arrangement could be employed and provided with two different chain drive motion transmitting systems whereby one of the chain drive systems is supported on the upper side of the transport follower mechanism pantograph linkage and a second chain drive motion transmission system is supported on the underside of the pantograph linkage. With such an arrangement it would be necessary to provide dual bifurcated adjustable end supports secured to the end of the remote linkage arm of the pantograph linkage mechanism and to the end of elongated boom 15 on the x-y transport mechanism. However, the provision of such modified structures is deemed to be well within the skill of a person knowledgeable in the art in the light of the teachings of the present disclosure. While it is unlikely that there are applications for automatic controlled machine tools of the type herein disclosed providing more than four degrees of controlled motion, should the occasion arise, it is feasible to provide a mechanism along the lines described herein having the capability of controlled motion along three orthogonal x, y and z axis of movement together with three additional degrees of controlled movement in roll, pitch and yaw. This can be accomplished by providing two pantograph linkage transport mechanism followers with each pantograph linkage mechanism having chain drive motion transmitting systems supported on the upper and lower surfaces thereof and driven through appropriate control-drive cams pursuant to the above teachings.

FIGS. 12, 13 and 14 illustrate an alternative embodiment of the invention wherein controlled movement of the working tool in three dimensions is achieved together with two additional controlled movements in either pitch, roll or yaw. In the embodiment of the invention shown in these figures, z-axis motion is imparted to the working member support plate 146 via a driven sprocket wheel 138 that rotates a threaded screw nut 141 coacting with threaded screw shaft 142 to raise or lower the working member support plate 146 relative to the fixed support plate 143 secured to the end of the elongated boom member 15 by support members 147. The apparatus as thus far described is entirely similar in construction and operation to the species of the invention described earlier with respect to FIGS. 1-7. Supported on the vertically movable working member support plate 146 is a conventional, commercially available, differential gear cluster secured on the underside of support plate 146 by subtending support arms 255A and 255B. The differential gear cluster comprised by elements 307, 308 and 309 is used to transmit two rotational motions which for example would constitute pitch and roll motions. The rotational motions identified as "A" and "B" rotation constitute the inputs to the differential gear cluster which combines the two inputs to provide a single output in pitch and roll as tabulated in the below set forth listing.

| INPUT   | OUTPUT  |
| ------- | ------- |
| +A, −B  | + Roll  |
| −A, +B  | − Roll  |
| +A, +B  | + Pitch |
| −A, −B  | − Pitch |

The input rotational motions "A" and "B" are supplied to the differential gear cluster by means of rotating shafts 254A and 254B, respectively, which are keyed to respective miter gears 253A and 253B. The miter gears 253A and 253B mesh with and are driven by respective, coacting miter gears 252A and 252B which in turn are keyed to and rotate with respective driven shafts 242A and 242B as will be explained more fully hereinafter.

All motions transmitted to the working head of the machine tool are transmitted each through its own pantograph linkage mechanism. Thus, the z-axis motion transmitted through the sprocket wheel 138 in the previously described manner will have a supporting pantograph transport follower mechanism similar to that described previously with respect to FIGS. 1–7 of the drawings. Consequently, the drive chain 130 which rotates sprocket wheel 138 will be supported by the end of the elongated boom member 15 as shown more fully in FIG. 2 of the drawings. The two additional input shafts 242A and 242B are provided with respective pantograph mechanisms shown generally at 137A' and 137A" in FIG. 12 of the drawings for supporting the drive chains 130' and 130" which drive respective sprocket wheels 138A and 138B keyed respectively to the shafts 242A and 242B. Each of the separate pantograph transport follower mechanisms represented by the parts 137A' and 137A" may be similar, for example, to the pantograph mechanism described with relation to FIGS. 8 and 9 of the drawings and will of course be coupled to and follow the motions of the x-y transport mechanism of the positioning apparatus. The chain drives 130' and 130" will be appropriately linked through interconnecting sprocket wheels, chains and rack and pinion cam follower arrangements so that each of the respective sprocket wheels 138A and 138B will be rotated pursuant to desired roll and pitch positioning information contained in the control cam groove of a respective control-drive cam mounted in common with the x, y and z cams on the common drive shaft 18 in a manner similar to that described with relation to FIGS. 1 and 2. Thus, it will be appreciated that the respective sprocket wheels 138A and 138B as well as the respective shafts 242A and 242B to which they are keyed, will be rotated in a controlled manner pursuant to the desired roll and pitch positioning of the working head of the machine tool.

In order to accommodate both rotational motion and longitudinal translation of the shafts 242A and 242B, respectively, splined, linear ball bushings or the equal thereof shown at 301 and 315 are mounted on the outer ends of the fixed support plate 143 together with suitable ball bearing raceways shown at 306. The splined linear ball bushings rotate within the base plate 143 by reason of the ball bearings 306 but are restricted from vertical longitudinal translation by retainer rings 303. The splined shafts 242A and 242B cannot rotate except through the medium of the ball bearing supported, complementary splined linear bushing 301 and 315 whereby the splined shafts 242A and 242B are allowed to move vertically up or down within the bushings 315, and 301, respectively. The bottom ends of the splined shaft 242A and 242B are not splined but instead are provided with smooth peripheral surfaces journaled in ball bearing raceways 305 mounted on the vertically movable support plate 146. The smooth ends of the shaft 242A and 242B are retained in the journals provided by the bearings 305 by suitable retainer rings 304 in a manner such that the shafts 242A and 242B move up or down with the working member support plate 146 but are free to rotate therewithin. The ends of the shafts 242A and 242B subtending below the bearing supports 305 are keyed to and drive the respective miter gears 252A and 252B. Thus, it will be appreciated that the motion, for example roll motion, transmitted to sprocket wheel 138A will be directly transmitted through the shaft 242A and miter gears 252A and 253A to provide the "A" rotational input to the bevel gear 307 of the differential gear cluster. Similarly, rotation of the sprocket wheel 138B to convey, for example pitch motion, results in rotation of the shaft 242B and hence miter gears 252B and 253B to provide the "B" rotational motion input to the bevel gear 308 of the differential gear cluster. The differential gear cluster will then combine two rotational inputs in the manner illustrated by the preceding table to provide desired roll and pitch orientation to the working head of the machine tool in addition to its proper placement in an x-y-z three-dimensional space by the novel positioning apparatus. This complex pattern of controlled motion is achieved with an all mechanical, cam controlled arrangement wherein each degree of movement is transmitted independently from a separate control-drive cam and is properly synchronized with other degrees of movement without interfering with the other degrees of movement.

From the foregoing description it will be appreciated that the invention provides a low cost, multi-directional movement, cam controlled mechanical positioning apparatus for automatically tracing out a predetermined path of movement for the working head of a machine tool or the like and which may be embodied in a single integral machine capable of operation either in three dimensions or in a two-dimensional plane coupled with controlled movement of the working head in either pitch, roll or yaw. Alternatively, the invention may be embodied in the form of an attachment for use with existing automatically controlled, planar positioning machines. The machines thus provided are relatively simple, inexpensive to manufacture, rugged in design and substantially maintenance free and dependable in operation.

Having described several embodiments of an all mechanical, multi-directional movement cam controlled automatic positioning apparatus with or without automatic controlled movements in either pitch, roll and/or yaw constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. A low cost multi-directional movement cam controlled mechanical positioning apparatus for automatically tracing out a predetermined path of movement for the working head of a machine tool or the like supported on a base member wherein said apparatus comprises a set of at least three relatively large diameter disk-type grooved control-drive cam surfaces rotatably supported on said base member for controlling movement of the working head within a plane defined by complementary axes of movement and along at least one additional degree of movement, means mounted on said base member for rotating said control-drive cam surfaces at predetermined speeds of rotation, cam followers engaging the respective movement inducing cam surfaces, linkage means coupled to respective ones of said cam followers for mechanically coupling movement of the cam followers to the working head of the machine tool to thereby move the working head over a predetermined path of movement, a differentially operable transport mechanism for supporting the working head, said differentially operable transport mechanism being movably supported on said base member by support means mounted for independent movement of the transport mechanism by respective cam follower and linkage means along each axis of movement with a plane defined by the complementary axes of movement without interference with movement of the transport mechanism along either complementary axes, said linkage mean including planar complementary axes of movement inducing linkage means coupled to and mechanically driving said transport mechanism along each axis of movement within the plane defined by the complementary axes of movement, a mechanical transport mechanism follower coupled between the base and the transport mechanism for freely and passively following movement of the transport mechanism in its plane of movement without interference and additional mechanical movement motion transmission apparatus responsive to the remaining cam follower and supported by said transport mechanism follower for mechanically transmitting at least one additional degree of movement to the working head.

2. A cam controlled mechanical positioning apparatus according to claim 1 wherein said transport mechanism follower comprise a swivel jointed pantograph mechanism having the end of one arm swivelly secured to the base member and the end of a remaining arm swivelly secured to the transport mechanism and wherein the plane of movement of the pantograph mechanism is parallel to the plane of movement of the transport mechanism.

3. A cam controlled mechanical positioning apparatus according to claim 1 wherein said additional mechanical motion transmission apparatus comprises linear to rotational motion converting means coupled to the remaining cam follower for converting linear movement of the additional cam follower to corresponding rotational motion and rotational motion translating means mounted adjacent the working head and responsive to the linear to rotational motion converting means for translating the rotational motion into another degree of movement for the working head.

4. A cam controlled mechanical positioning apparatus according to claim 2 wherein said additional mechanical motion transmission comprises linear to rotational motion converting means coupled to the remaining cam follower for converting linear movement of the additional cam follower to corresponding rotational motion and rotational motion translating means mounted adjacent the working head and responsive to the linear to rotational motion converting means for translating the rotational motion into another degree of movement for the working head.

5. A cam controlled mechanical positioning apparatus according to claim 3 wherein the linear to rotational motion converting means comprises rack and pinion means coupled to the additional cam follower and first sprocket and chain drive means mechanically driven by the pinion of the rack and pinion means and wherein said rotational motion translating means comprises second sprocket and chain driven means responsive to said first sprocket and chain drive means and additional working head drive means supported by the transport mechanism, said additional working head drive means being coupled to and driving the working head along at least one additional degree of movement and being coupled to and driven by the second sprocket and chain driven means.

6. A cam controlled mechanical positioning apparatus according to claim 4 wherein the linear to rotational motion converting means comprises rack and pinion means coupled to the additional cam follower and first sprocket and chain drive means mechanically driven by the pinion of the rack and pinion means and wherein said rotational motion translating means comprises second sprocket and chain driven means responsive to said first sprocket and chain drive means and rotatable working head drive means supported on the transport mechanism, said rotatable working head drive means being coupled to and driving the working head along at least one additional path of movement and being mechanically coupled to and driven by the second sprocket and chain driven means.

7. A cam controlled mechanical positioning apparatus according to claim 1 further including elongated boom means having one end secured to the transport mechanism with the working head supported on the remaining free end and wherein the transport mechanism follower is secured to and follows movement of the elongated boom means.

8. A cam controlled mechanical positioning apparatus according to claim 2 further including elongated boom means having one end secured to the transport mechanism and the working head supported on its remaining free end, the swivel jointed pantograph mechanism having the end of one arm swivelly secured to the end of the boom means supporting the working head and having the end of a remaining arm swivelly secured to the base member.

9. A cam controlled mechanical positioning apparatus according to claim 6 further including elongated boom means having one end secured to the transport mechanism and the working head supported on its remaining free end, the swivel jointed pantograph mechanism having the end of one arm swivelly secured to the end of the boom means supporting the working head and having the end of a remaining arm swivelly secured to the base member.

10. A cam controlled mechanical positioning apparatus according to claim 1 further including mechanical movement amplifying means acting on the transport mechanism for amplifying and extending the movement translated to the working head along at least one axis of movement.

11. A cam controlled mechanical positioning apparatus according to claim 9 further including mechanical movement amplifying means acting on the transport mechanism for amplifying and extending the movement translated to the working head along at least one axis of movement.

12. A cam controlled mechanical positioning apparatus according to claim 11 wherein the relatively large disktype control-drive cam surfaces are generally circular in shape and have a diameter of the order of 20 to 40 inches with the control-drive cam surfaces being formed at any point along a radius whereby the radius defines the full stroke of movement of the cam follower.

13. A cam controlled mechanical positioning apparatus according to claim 12 wherein the control-drive cam surfaces comprise grooves formed in corresponding flat surfaces of three disk-type control-drive cams with the grooves being double acting in effect whereby bidirectional control of movement of the cam follower is achieved and the flat surfaces of the control-drive cams on which the grooves are formed are downwardly disposed whereby the control-drive cam surfaces are protected from the deposition of dirt or other matter and minimal frictional contact resistance with the cam follower is achieved.

14. A cam controlled mechanical positioning apparatus according to claim 13 wherein the cam follower, the linkage means and the transport mechanism all are constructed of light-weight durable material whereby minimum inertia effects are attained and dynamic forces acting on the apparatus are maintained at a low level.

15. A cam controlled mechanical positioning apparatus according to claim 14 wherein the contour of the cam surfaces formed in the respective control-drive cams is designed to include the kinematics of the follower, the linkage means and the transport mechanism in order to provide a desired motion pattern for the working head and the contour of the control-drive cam surfaces is not identical to the configuration of the path of movement of the working head.

16. A cam controlled mechanical positioning apparatus according to claim 1 further including a controller-actuator disk mounted coaxially with a plurality of disk-type control-drive cams on which the control drive cam surfaces are formed and further including electrical encoding means peripherally arrayed around said controller-actuator disk and engagable thereby at certain peripheral points during rotation of the disk whereby electrical control signals are produced for controlling desired auxiliary functions at predetermined points in the path of movement of the working head.

17. A cam controlled mechanical positioning apparatus according to claim 15 further including a controller-actuator disk mounted coaxially with the disk-type control-drive cams and further including electrical encoding means peripherally arrayed around said controller-actuator disk and engagable thereby at certain peripheral points during rotation of the disk whereby electrical control signals are produced for controlling desired auxiliary functions at predetermined points in the path of movement of the working head.

18. A cam controlled mechanical positioning apparatus according to claim 17 wherein said disk-type control-drive cams and controller-actuator disk include means whereby they may be readily removed and replaced with other cams and disks having differently programmed control surfaces formed therein for producing a different pattern of movement for the working head.

19. A cam controlled mechanical positioning apparatus according to claim 1 wherein said linkage means comprises at least one pivoted swinging arc linkage arm having its respective cam follower engaging an intermediate point thereof between a pivoted end and a swinging arc free end for mechanically amplifying the scope of movement induced by the control-drive cam surfaces and cam follower at the swinging arc free end, the swinging arc free end of the respective linkage arm being connected to the transport mechanism for providing a greater scope of movement thereto than the scope of movement of the cam follower and wherein the contour of the control drive cam surfaces is designed to compensate for the swinging arc movement of the swinging arc free end of the linkage arm to convert movement thereof to substantially rectilinear movement.

20. A cam controlled mechanical positioning apparatus according to claim 18 wherein said linkage means comprises at least one pivoted swinging arc linkage arm having its respective cam follower engaging an intermediate point thereof between a pivoted end and a swinging arc free end for mechanically amplifying the scope of movement induced by the control-drive cam and cam follower at the swinging arc free end, the swinging arc free end of the respective linkage arm being connected to the transport mechanism for providing a greater scope of movement thereto than the scope of movement of the cam follower and wherein the contour of the cam surfaces formed in the respective control-drive cams is designed to compensate for the swinging arc movement of the swinging arc free end of the linkage arm to convert the movement thereof to substantially rectilinear movement.

21. A low cost three-dimensional movement cam controlled mechanical positioning apparatus for automatically tracing out a predetermined path of movement for the working head of a machine tool or the like wherein said apparatus comprises at least three relatively large diameter disk-type grooved control-drive cam surfaces driven by a common drive shaft rotatably supported on a base member, motor means mounted on said base member and coupled to said common drive shaft for rotating said control-drive cam surfaces at a predetermined speed of rotation, at least three cam followers engaging respective cam surfaces for inducing x, y and z movements, x, y and z axis linkage means coupled to respective ones of said cam followers for mechanically coupling movement of the cam followers to the working head to thereby move the working head over a predetermined three-dimensional path of movement, a differentially operated transport mechanism for supporting the working head, said transport mechanism being movably supported by support means and mounted for independent movement along the respective x or y axis without interference, the x and y axis linkage means being coupled to and mechanically driving said transport mechanism in a manner such that the plane of x-y movement of the transport mechanism is parallel to the plane of the control-drive cam surfaces, a transport mechanism follower coupled between the base member and the transport mechanism for freely and passively following movement of the transport mechanism in the x-y plane of movement without interference and additional z-axis mechanical movement transmission apparatus responsive to the z-axis cam follower and supported by said transport mechanism follower for mechanically transmitting z-axis movement to the working head.

22. A cam controlled mechanical positioning apparatus according to claim 21 wherein said transport mechanism follower comprises a swivel jointed pantograph mechanism having the end of one arm swivelly secured to the base member and the end of a remaining arm swivelly secured to the transport mechanism and wherein the plane of movement of the pantograph mechanism is parallel to the x-y plane of movement of the transport mechanism.

23. A cam controlled mechanical positioning apparatus according to claim 22 wherein said z-axis additional movement transmission apparatus comprises linear to rotational motion converting means coupled to the z-axis cam follower for converting z-axis linear movement of the z-axis cam follower to corresponding rotational motion and rotational to linear motion converting means mounted to the working head for reconverting the rotational motion to linear movement of the working head along the z-axis of movement.

24. A cam controlled mechanical positioning apparatus according to claim 23 wherein the linear to rotational motion converting means comprises rack and pinion means coupled to the z-axis cam follower and first sprocket and chain drive means mechanically driven by the pinion of the rack and pinion means and wherein said rotational to linear motion converting means comprises second sprocket and chain driven means responsive to said first sprocket and chain drive means and rotatable screw shaft and nut means mounted to the transport mechanism, said rotatable screw shaft rotatably driving the working head along the z-axis of movement and being mechanically coupled to and rotated by the second sprocket and chain driven means.

25. A cam controlled mechanical positioning apparatus according to claim 21 further including elongated boom means having one end secured to the transport mechanism with the working head supported on the remaining free end and wherein the transport mechanism follower is secured to and follows movement of the elongated boom means.

26. A cam controlled mechanical positioning apparatus according to claim 24 further including elongated boom means having one end secured to the transport mechanism and the working head supported on the remaining free end, the swivel jointed pantograph mechanism having the end of one arm swivelly secured to the end of the boom means supporting the working head and having the end of a remaining arm swivelly secured to the base member.

27. A cam controlled mechanical positioning apparatus according to claim 26 further including a controller-actuator disk mounted coaxially with a plurality of disk-type control-drive cams on which the control drive cam surfaces are formed and mounted on the rotatable drive shaft and further including electrical encoding means peripherally arrayed around said controller-actuator disk and engagable thereby at certain peripheral points during rotation of the disk whereby electrical control signals are produced for controlling desired auxiliary functions at predetermined points in the path of movement of the working head.

28. A cam controlled mechanical positioning apparatus according to claim 27 wherein said disk-type control-drive cams and controller-actuator disk include means whereby they may be readily removed and replaced with other cams and disks having differently programmed control surfaces formed thereon for producing a different pattern of movement for the working head, the relatively large disk-type control-drive cams are generally circular in shape and have a diameter of the order of 20 to 40 inches with the control-drive cam surfaces being formed at any point along a radius of the cam whereby the radius defines the full stroke of movement of the cam follower, the control-drive cam surfaces comprise grooves formed in corresponding flat surfaces of the disk-type control-drive cams with the grooves being double acting in effect whereby bidirectional control of movement of the cam follower is achieved and the common drive shaft is mounted with its axis extending in a vertical up-down direction and the flat surfaces of the control-drive cams on which the grooves are formed are downwardly disposed whereby the control-drive cam surfaces are protected from the deposition of dirt or other matter and minimal frictional contact resistance with the cam follower is achieved, the cam follower, the linkage means and the transport mechanism all are constructed of light-weight durable material whereby minimum inertia effects are attained and dynamic forces acting on the apparatus are maintained at a low level, and the contour of the cam surfaces formed in the respective control-drive cams is designed to include the kinematics of the follower, the linkage means and the transport mechanism in order to provide a desired motion pattern for the working head and the contour of the control-drive cam surfaces is not identical in configuration to the path of movement of the working head.

29. A cam controlled mechanical positioning apparatus according to claim 28 wherein certain of the relatively large diameter disk-type control-drive cams have at least two different control cam grooved surfaces formed thereon for producing respective different preprogrammed patterns of movement by the working head of the apparatus and further including means for selecting desired ones of the control cam grooved surfaces for controlling movement of the apparatus.

30. A cam controlled mechanical positioning apparatus according to claim 21 wherein said linkage means comprises at least one pivoted swinging arc linkage arm having its respective cam follower engaging an intermediate point thereof between a pivoted end and a swinging arc free end for mechanically amplifying the scope of movement induced by the control-drive surfaces cam and cam follower at the swinging arc free end, the swinging arc free end of the respective linkage arm being connected to the transport mechanism for providing a greater scope of movement thereto than the scope of movement of the cam follower and wherein the contour of the cam surfaces is designed to compensate for the swinging arc movement of the swinging arc free end of the linkage arm to convert the movement thereof to substantially rectilinear movement of the transport mechanism.

31. A cam controlled mechanical positioning apparatus according to claim 21 further including mechanical movement amplifying means acting on the transport mechanism for amplifying and extending the movement translated to the working head along at least one axis of movement.

32. In a low cost cam controlled mechanical positioning apparatus for automatically tracing out a predetermined path of movement for the working head of a machine tool or the like wherein said apparatus comprises a set of relatively large diameter disk-type control-drive cams secured in parallel planes on a common drive shaft rotatably supported on a base member, motor means mounted on said base member and coupled to said common drive shaft for rotating said common drive shaft and said control-drive cams at a predetermined speed of rotation, x and y cam followers engaging respective x and y axis of movement inducing cam surfaces formed on respective ones of said control-drive cams, x, y linkages coupled to respective ones of said cam followers for mechanically coupling movement of the cam followers to a working head to thereby move the working head over predetermined paths along x and y axes of movement, a differentially operable transport mechanism for supporting the working head, said transport mechanism being movably supported by support means and mounted for independent and interference free movement along the respective x and y axes with the x and y axis linkages being coupled to and mechanically driving said transport mechanism in a manner such that the plane of the x-y movement of the transport mechanism is parallel to the planes of the control-drive cams; the improvement comprising at least one additional large diameter disk-type control-drive cam for providing additional controlled movement to the working head of the machine tool, said additional control-drive cam being secured to the common drive shaft parallel to said x and y axis control-drive cams, an additional cam follower engaging the cam drive surface of said additional control-drive cam, a transport mechanism follower coupled between the base member and the differentially operable transport mechanism for freely and passively following movement of the transport mechanism in the the x-y plane without interference and additional mechanical movement motion transmission apparatus responsive to the additional movement cam follower and supported by said transport mechanism follower for mechanically transmitting at least one additional degree of movement to the working head.

33. A cam controlled mechanical positioning apparatus according to claim 32 wherein said transport mechanism follower comprises a swivel jointed pantograph mechanism having the end of one arm swivelly secured to the base member and the end of the remaining arm swivelly secured to the transport mechanism and wherein the plane of movement of the pantograph mechanism is parallel to the x-y plane of movement of the transport mechanism.

34. A cam controlled mechanical positioning apparatus according to claim 33 wherein said additional mechanical movement motion transmission apparatus comprises linear to rotational motion converting means coupled to the additional movement cam follower for converting linear movement of the additional cam follower means to corresponding rotational motion and rotational motion translating means mounted adjacent the working head for translating the rotational motion into another degree of movement for the working head.

35. A cam controlled mechanical positioning apparatus according to claim 34 wherein the linear to rotational motion converting means comprises rack and pinion means coupled to the additional cam follower and first sprocket and chain drive means mechanically driven by the pinion of the rack and pinion means and wherein said rotational motion translating means comprises second sprocket and chain driven means responsive to said first sprocket and chain drive means and coupled to and driving the working head along at least one additional degree of movement.

36. A cam controlled mechanical positioning apparatus according to claim 35 further including elongated boom means having one end secured to the transport mechanism with the working head supported on the remaining free end and wherein the transport mechanism follower is secured to and follows movement of the elongated boom means.

37. A cam controlled mechanical positioning apparatus according to claim 35 further including elongated boom means having one end secured to the transport mechanism and the working head supported on its remaining free end, the swivel jointed pantograph mechanism having the end of one arm swivelly secured to the end of the elongated boom means supporting the working head and having a remaining arm swivelly secured to the base member.

38. A cam controlled mechanical positioning apparatus according to claim 37 further including a controller-actuator disk mounted coaxially with the disk-type control drive cams on the rotatable drive shaft and further including electrical encoding means peripherally arrayed around said controller-actuator disk and engagable thereby at certain peripheral points during rotation of the disk whereby electrical control signals are produced for controlling desired auxiliary functions at predetermined points in the path of movement of the working head.

39. A cam controlled mechanical positioning apparatus according to claim 38 wherein said disk-type control-drive cam and controller-actuator disk include means whereby they may be readily removed and replaced with other cams and disks having differently programmed control surfaces formed thereon for producing a different pattern of movement for the working head, the relatively large disk-type control-drive cams are generally circular in shape and have a diameter of the order of 20 to 40 inches with the control-drive cam surfaces being formed at any point along a radius of the cam whereby the radius defines the full stroke of movement of the cam follower, the control-drive cam surfaces comprise grooves formed in corresponding flat surfaces of the disk-type control-drive cams with the grooves being double acting in effect whereby bidirectional control of movement of the cam follower is achieved and the common drive shaft is mounted with its axis extenting in a vertical up-down direction and the flat surfaces of the control-drive cams on which the grooves are formed are downwardly disposed whereby the control-drive cam surfaces are protected from the deposition of dirt or other matter and minimal frictional contact reistance with the cam follower is achieved, the cam follower, the linkage means and the transport mechanism all are constructed of light-weight durable material whereby minimum inertia effects are attained and dynamic forces acting on the apparatus are maintained at a low level and the contour of the cam surfaces formed in the respective control-drive cams is designed to include the kinematics of the follower, the linkage and the transport mechanism in order to provide a desired motion pattern for the working head and the contour of the control-drive cam surfaces is not identical in configuration to the path of movement of the working head.

40. A low cost cam controlled multi-directional movement mechanical positioning mechanism for providing an additional third dimensional and/or orthogonal pitch, roll or yaw movements for the working head of a machine tool or the like supported on a base member and having an x-y axis of movement mechanism capable of automatically providing a predetermined path of movement for the working head of a machine tool in a two-dimensional x-y plane, said mechanism comprising at least one relatively large diameter disk-type rotatable control-drive cam having at least one additional movement inducing control-drive cam surface formed thereon and secured to a drive shaft rotatably supported on a base member, means coupled to said drive shaft for rotating the same at a predetermined speed of rotation related to the movement of the working head in the two-dimensional x-y plane, respective additional movement cam follower engaging the additional movement inducing cam surface formed on the additional control-drive cam, and linkage means coupled to said additional movement cam follower for mechanically coupling movement of the cam follower to the working head to thereby move the working head either along an additional axis of movement orthogonal to the x-y plane of movement of the machine tool and/or to provide pitch, roll or yaw movements, said linkage means including an x-y axis of movement mechanism follower coupled between the base member and the x-y axis of movement mechanism for freely and passively following movement of said mechanism in the x-y plane without interference and additional mechanical movement motion transmission apparatus responsive to the additional cam follower means and supported by said x-y axis of movement mechanism follower for mechanically transmitting additional movement to the working head.

41. A cam controlled mechanical positioning mechanism according to claim 40 wherein said x-y axis of movement mechanism follower comprises a swivel jointed pantograph mechanism having the end of one arm swivelly secured to the base member and the end of the remaining arm swivelly secured to the x-y axis of movement mechanism and wherein the plane of movement of the pantograph mechanism is parallel to the x-y plane of movement of the x-y axis of movement mechanism.

42. A cam controlled mechanical positioning apparatus according to claim 41 wherein said additional mechanical movement motion transmission apparatus comprises linear to rotational motion converting means coupled to the additional movement cam follower for converting linear movement of the additional movement cam follower to corresponding rotational motion and rotational motion translating means mounted adjacent the working head and responsive to the linear to rotational motion converting means for translating the rotational motion into another degree of movement for the working head.

43. A cam controlled mechanical positioning apparatus according to claim 42 wherein the linear to rotational motion converting means comprises rack and pinion means coupled to the additional movement cam follower and first sprocket and chain drive means mechanically driven by the pinion of the rack and pinion means and wherein said rotational motion translating means comprises second sprocket and chain driven means responsive to said first sprocket and chain drive means and coupled to and driving the working head along at least one additional degree of movement.

44. A cam controlled mechanical positioning mechanism according to claim 40 further including elongated boom means having one end secured to and supported by the x-y axis movement mechanism and having the working head of the machine tool supported on the remaining free end thereof.

45. A cam controlled mechanical positioning mechanism according to claim 44 further including elongated boom means having one end secured to and supported by the x-y axis movement mechanism and having the working head supported on the remaining free end thereof, the swivel jointed pantograph mechanism having the end of one arm swivelly secured to the end of the elongated boom means supporting the working head and having the end of the remaining arm swivelly secured to the base member.

46. A cam controlled positioning apparatus according to claim 40 wherein the additional movement provided to the working head of the mechanism is along the z-axis.

47. A cam controlled positioning apparatus according to claim 40 wherein the additional movement provided to the working head of the mechanism is rotational about the x-axis in the nature of pitch.

48. A cam controlled positioning apparatus according to claim 40 wherein the additional movement provided to the working head of the mechanism is rotational about the y-axis in the nature of roll.

49. A cam controlled positioning apparatus according to claim 40 wherein the additional movement provided to the working head of the mechanism is rotational about the z-axis in the nature of yaw.

50. A cam controlled positioning apparatus according to claim 43 wherein the additional movement provided to the working head of the mechanism is along the z-axis.

51. A cam controlled positioning apparatus according to claim 43 wherein the additional movement provided to the working head of the mechanism is rotational about the x-axis in the nature of pitch.

52. A cam controlled positioning apparatus according to claim 43 wherein the additional movement provided to the working head of the mechanism is rotational about the y-axis in the nature of roll.

53. A cam controlled positioning apparatus according to claim 43 wherein the additional movement provided to the working head of the mechanism is rotational about the z-axis in the nature of yaw.

54. A cam controlled mechanical positioning apparatus according to claim 32 wherein the additional degree of controlled movement provided to the working head of the apparatus is along the z-axis.

55. A cam controlled mechanical positioning apparatus according to claim 32 wherein the additional degree of controlled movement provided to the working head of the apparatus is rotational about the x-axis in the nature of pitch.

56. A cam controlled mechanical positioning apparatus according to claim 32 wherein the additional degree of controlled movement provided to the working head of the apparatus is rotational about the y-axis in the nature of roll.

57. A cam controlled mechanical positioning apparatus according to claim 32 wherein the additional degree of controlled movement provided to the working head of the apparatus is rotational about the z-axis in the nature of yaw.

58. A cam controlled mechanical positioning apparatus according to claim 35 wherein the additional degree of controlled movement provided to the working head of the apparatus is along the z-axis.

59. A cam controlled mechanical positioning apparatus according to claim 35 wherein the additional degree of controlled movement provided to the working head of apparatus is rotational about the x-axis in the nature of pitch.

60. A cam controlled mechanical positioning apparatus according to claim 35 wherein the additional degree of controlled movement provided to the working head of the apparatus is rotational about the y-axis in the nature of roll.

61. A cam controlled mechanical positioning apparatus according to claim 35 wherein the additional degree of controlled movement provided to the working head of the apparatus is rotational about the z-axis in the nature of yaw.

62. A low cost cam controlled multi-directional movement mechanical positioning mechanism for providing third dimensional and pitch, roll or yaw movements for the working head of a machine tool or the like supported on a base member and having an x-y axis of movement mechanism capable of automatically providing a predetermined path of movement for the working head of a machine tool in a two dimensional x-y plane, said mechanism comprising a set of relatively large diameter disk-type, rotatable control-drive cams and additional movement inducing control-drive cam surfaces secured to a drive shaft rotatably supported on a base member, motor means coupledd to said drive shaft for rotating the control-drive cams at a predetermined speed of rotation related to the movement of the working head in the two-dimensional x-y plane, respective additional movement cam followers engaging the additional movement inducing cam surfaces formed on the control-drive cams, and linkage means coupled to said respective additional movement cam followers for mechanically coupling movement of the cam followers to the working head to thereby move the working head along an additional third dimensional axis of movement orthogonal to the x-y plane of movement of the machine tool and to provide pitch, roll or yaw movements thereto, said linkage means including an x-y axis of movement mechanism follower coupled between the base member the x-y axis of movement mechanism for freely and passively following movement of said mechanism in the x-y plane without interference and additional mechanical movement motion transmission apparatus responsive to the respective additional cam followers and supported to said x-y axis of movement mechanism follower for directly transmitting the additional z axis and pitch, roll or yaw movements to the working head.

* * * * *